US012335814B2

(12) United States Patent
Cattermole et al.

(10) Patent No.: US 12,335,814 B2
(45) Date of Patent: Jun. 17, 2025

(54) DEVICES AND METHODS FOR OBJECT LOCATION IDENTIFICATION

(71) Applicant: Vypex Pty Ltd, Richmond (AU)

(72) Inventors: James Cattermole, Hawthorn (AU); Bart Drew, Malvern East (AU); Benjamin Nicholls, Reservoir (AU); Vaughn Coetzee, Point Cook (AU)

(73) Assignee: Vypex Pty Ltd., Richmond (AU)

( * ) Notice: Subject to any disclaimer, the term of this patent is extended or adjusted under 35 U.S.C. 154(b) by 161 days.

(21) Appl. No.: 18/358,099

(22) Filed: Jul. 25, 2023

(65) Prior Publication Data
US 2024/0373192 A1    Nov. 7, 2024

(30) Foreign Application Priority Data

May 4, 2023   (AU) ................. 2023901347

(51) Int. Cl.
*H04W 4/029*   (2018.01)
*H04W 4/80*   (2018.01)

(52) U.S. Cl.
CPC ............. *H04W 4/029* (2018.02); *H04W 4/80* (2018.02)

(58) Field of Classification Search
CPC ................................ H04W 4/029; H04W 4/08
USPC ........................................................ 455/456.1
See application file for complete search history.

(56) References Cited

U.S. PATENT DOCUMENTS

| | | | |
|---|---|---|---|
| 7,512,783 B2 * | 3/2009 | Naghian | H04W 12/06 713/176 |
| 8,064,363 B2 | 11/2011 | Kohvakka et al. | |
| 11,356,835 B2 | 6/2022 | Curticapean et al. | |
| 11,493,639 B2 | 11/2022 | Viskari et al. | |
| 2005/0134459 A1 * | 6/2005 | Glick | H04W 12/63 340/572.1 |

(Continued)

FOREIGN PATENT DOCUMENTS

| | | |
|---|---|---|
| JP | 2010-093606 A | 4/2010 |
| WO | WO 2020/030969 A2 | 2/2020 |

(Continued)

OTHER PUBLICATIONS

Jun. 13, 2024 Search Report issued in International Application No. PCT/AU2024/050396; 6 pp.

(Continued)

*Primary Examiner* — William Nealon
(74) *Attorney, Agent, or Firm* — Nelson Mullins Riley & Scarborough LLP

(57) ABSTRACT

Embodiments relate to methods and systems for object location tracking of one object from among many objects in a same vicinity. An example method includes: affixing a location tracking device to each of the one object and the many objects, the location tracking device being configured to: detect a movement state of the location tracking device; in response to detecting the movement state, establish a connection to identify itself to an external server and to identify a location of the location tracking device and the one object; and if the connection is established, then allow connection with one or more other location tracking devices, so that the one or more other location tracking devices can be identified to the external server to identify the location of the one or more location tracking devices.

19 Claims, 8 Drawing Sheets

(56) References Cited

U.S. PATENT DOCUMENTS

| | | | |
|---|---|---|---|
| 2009/0201850 A1* | 8/2009 | Davis | G01S 5/0009 370/328 |
| 2010/0022190 A1* | 1/2010 | Laroia | H04W 40/12 455/67.11 |
| 2010/0110930 A1 | 5/2010 | Kohvakka et al. | |
| 2012/0036198 A1* | 2/2012 | Marzencki | H04W 52/50 709/206 |
| 2017/0085291 A1* | 3/2017 | Linkesch | G06K 19/07722 |
| 2017/0278061 A1* | 9/2017 | Skaaksrud | G06Q 10/087 |
| 2019/0364440 A1 | 11/2019 | Juven et al. | |
| 2020/0100086 A1 | 3/2020 | Curticapean et al. | |
| 2020/0309959 A1 | 10/2020 | Viskari et al. | |
| 2021/0282004 A1 | 9/2021 | Pirskanen et al. | |
| 2021/0392656 A1 | 12/2021 | Pirskanen et al. | |
| 2022/0377685 A1 | 11/2022 | Juven et al. | |
| 2022/0408432 A1 | 12/2022 | Kaseva et al. | |

FOREIGN PATENT DOCUMENTS

| | | |
|---|---|---|
| WO | WO 2022/136739 A1 | 6/2022 |
| WO | WO 2023/031516 A1 | 3/2023 |

OTHER PUBLICATIONS

Jun. 13, 2024 Written Opinion of the International Searching Authority issued in International Application No. PCT/AU2024/050396; 7 pp.

Examination Report dated Nov. 1, 2024 issued in Australia Patent Application No. 2024227650; 4pp.

\* cited by examiner

DEVICES AND METHODS FOR OBJECT LOCATION IDENTIFICATION

CROSS-REFERENCE TO RELATED APPLICATIONS

This application claims priority to Australian patent application No. 2023901347, entitled "Devices and methods for object location identification", filed May 4, 2023; the contents of which is hereby incorporated by reference in its entirety.

TECHNICAL FIELD

The present disclosure relates to location tracking devices and methods. In particular, embodiments relate to devices and methods for identifying and tracking the location of an object.

BACKGROUND

Radio frequency (RF) waves are commonly used to move data wirelessly between devices. Like all technology, RF signals have some limitations. RF signals are broadcast and received at certain bands and channels within those bands. While being good at penetrating a lot of materials, RF signals cannot penetrate everything, and are very susceptible to attenuation when passing through glass, steel, and timber. An RF signal can be significantly weakened each time it comes into contact with one of these materials.

While an RF signal can be heavily attenuated when passing through certain materials, it is unusual for it be stopped completely. The RF signal gets weaker over distance, and the materials that are very difficult to penetrate shorten the readable distance of the RF signal considerably. This poses an issue in a warehouse environment, where these type of materials, especially steel and timber, are prevalent, such as in the form of pallets or steel cages. In particular, timber is especially good at absorbing an RF signal. This has the result that sending RF signals between RF devices in a warehouse with numerous wood or steel objects becomes unreliable and difficult.

It is desired to address or ameliorate one or more shortcomings or disadvantages of prior RF devices, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Some embodiments relate to a method of pallet location tracking of one pallet from among many pallets in a same vicinity, the method including:
affixing a location tracking device to each of the one pallet and the many pallets, the location tracking device being configured to:
detect a movement state of the location tracking device;
in response to detecting the movement state, establish a connection to identify itself to an external server; and
if the connection is established, then allow connection with one or more other location tracking devices, so that the one or more other location tracking devices can be identified to the external server.

The location tracking device may be further configured to, if the connection is not established, disable all functionality of the location tracking device not required to detect the movement state of the location tracking device.

The method may further include, after the affixing, receiving at the external server device identification data from the location tracking device of the one pallet, wherein the device identification data uniquely identifies the one pallet.

The method may further include, after the affixing, receiving at the external server device identification data from the location tracking device of the one pallet and the location tracking devices of the many pallets.

The device identification data from the location tracking devices of the many pallets may be received from the location tracking device of the one pallet.

The method may further include, after the receiving, accessing the external server to identify a location of the one pallet.

The movement state may be detected based on output of a movement sensor in each location tracking device, wherein detection of the movement state includes detecting when the location tracking device has moved for a first minimum time period followed by no movement for a second minimum time period. The first minimum time period may be between about 5 seconds to about 30 seconds. The second minimum time period may be between about 5 seconds to about 30 seconds.

Some embodiments relate to a system for pallet location tracking including:
multiple location tracking devices, each location tracking device carried by a pallet, the location tracking device being configured to:
detect a movement state of the location tracking device;
in response to detecting the movement state, establish a connection to identify itself to an external server; and
if the connection is established, then allow connection with one or more other location tracking devices, so that the one or more other location tracking devices can be identified to the external server; and
the external server, wherein the external server is configured to identify a location of each pallet based on a location of the respective identified location tracking device carried by the pallet.

Each location tracking device may include a movement sensor and the movement state is detected based on output of the movement sensor, wherein detection of the movement state includes detecting when the location tracking device has moved for a first minimum time period followed by no movement for a second minimum time period. The first minimum time period may be between about 5 seconds to about 30 seconds. The second minimum time period may be between about 5 seconds to about 30 seconds.

Some embodiments relate to a location tracking device to be carried by an object for tracking the location of the object, wherein the location tracking device is a first location tracking device comprising:
processing circuitry;

memory accessible to the processing circuitry, wherein the memory is configured to store first device data of the first location tracking device, the first device data including location data;

a movement sensor to detect movement of the first location tracking device;

a low-power short-range radio frequency (RF) communications module;

a battery to supply power to the processing circuitry, the memory, the movement sensor, and the communications module;

a housing to house the processing circuitry, the memory, the movement sensor, the communications module, and the battery; and wherein the memory stores instructions that, when executed by the processing circuitry, cause the processing circuitry to:

detect a movement state, based on output of the movement sensor, in which the first location tracking device has moved for a first minimum time period followed by no movement for a second minimum time period;

in response to detecting the movement state, attempt to initiate wireless communication to a gateway device, via the RF communications module:

if the attempt to initiate wireless communication to the gateway device is successful, then set an operational mode of the first location tracking device to a help mode to allow communication with at least one third location tracking device, via the RF communications module;

if the attempt to initiate wireless communication to the gateway device is unsuccessful, then attempt to initiate communication to a second location tracking device, via the RF communications module:

if the attempt to initiate wireless communication to the second location tracking device is unsuccessful, then set an operational mode of the first location tracking device to a sleep mode;

if the attempt to initiate wireless communication to the second location tracking device is successful, then set an operational mode of the first location tracking device to the help mode to allow communication to at least one third location tracking device, via the RF communications module;

wherein in the help mode, the processing circuitry is configured to execute instructions to:

allow communication with the at least one third location tracking device, via the RF communications module, for a third minimum time period;

transmit the first device data and received device data from the at least one third location tracking device to the gateway device or the second location tracking device, via the RF communications module; and set the operational mode of the first location tracking device to the sleep mode after transmitting the first device data and received device data from the at least one third location tracking device.

Transmitting the first device data and received device data may further include transmitting, when no third location tracking devices are in communication with the first location tracking device, the first device data and received device data from the at least one third location tracking device to the gateway device or the second location tracking device, via the RF communications module.

The memory may store further instructions that, when executed by the processing circuitry, cause the processing circuitry to exit the sleep mode, if the first location tracking device is in the sleep mode when the movement state is detected. In the sleep mode, RF communication functions of the first location tracking device may be disabled. In the sleep mode, all functions of the first location tracking device not required in detecting the movement state may be disabled.

The first minimum time period may be between about 5 seconds and about 30 seconds. The second minimum time period may be between about 5 seconds and about 30 seconds. The help mode may be performed for a third minimum time period between about 1 second and about 30 seconds.

The movement sensor may have a power consumption of between about 30 nanoAmperes in a power-down mode to about 1 microAmpere in a normal operational mode.

The first location tracking device may be configured to attempt to initiate wireless communication with the gateway device for a first maximum time period. The first location tracking device may be configured to attempt to initiate wireless communication with the second location tracking device for a second maximum time period after the attempt to communicate with the gateway device is unsuccessful.

The first location tracking device may further comprise:

a WiFi communications module and a mobile data communications module powered by the battery and housed in the housing; and wherein the memory further stores instructions that, when executed by the processing circuitry, cause the processing circuitry to:

if the attempt to initiate wireless communication to the second location tracking device via the RF communications module is unsuccessful, then perform a scan to identify at least one WiFi access point, via the WiFi communications module;

if the scan does not identify at least one WiFi access point, then set an operational mode of the first location tracking device to the sleep mode; and if the scan identifies at least one WiFi access point, then:

receive, via the WiFi communications module, WiFi access point data from the WiFi access point;

transmit, via the mobile data communications module, the WiFi access point data to an external server for identifying a location of the first location tracking device based on the transmitted WiFi access point data; and set an operational mode of the first location tracking device to the help mode to allow communication, via the RF communications module, to at least one third location tracking device.

In the help mode, transmitting the first device data and received device data may include:

transmitting the first device data and the received device data from the at least one third location tracking device to:

the gateway device, if communication to the gateway device via the RF communications module is successful;

the second location tracking device, if communication to the second location tracking device via the RF communications module is successful; or to the external server via the mobile data communications module.

In the help mode, the instructions may further include instructions to:

prior to transmitting the first device data and the received device data from the at least one third location tracking device to the external server via the mobile data communications module, attempt to initiate wireless communication to at least one of: another gateway device or another second location tracking device that includes a mobile data communications module.

In the help mode, the processing circuitry may be configured to execute instructions to:

allow communication from the at least one third location tracking device, via the RF communications module, for a third minimum time period;

transmit the first device data and the received device data from the at least one third location tracking device to:
the gateway device, if communication to the gateway device via the RF communications module is successful;
the second location tracking device, if communication to the second location tracking device via the RF communications module is successful; or
attempt to initiate wireless communication with at least one of another gateway device or another second location tracking device that includes a mobile data communications module;
if the attempt to initiate wireless communication to the another gateway device or another second location tracking device that includes a mobile data communications module is successful, transmit the first device data and the received device data from the at least one third location tracking device to the another gateway device or the another second location tracking device and set the operational mode of the first location tracking device to the sleep mode;
if the attempt to initiate wireless communication to the another gateway device or another second location tracking device that includes a mobile data communications module is unsuccessful, transmit the first device data and received device data to the external server via the mobile data communications module and set the operational mode of the first location tracking device to the sleep mode.

The first location tracking device may be configured to attempt to initiate wireless communication with the at least one WiFi access point for a third maximum time period.

The first location tracking device may further comprise:
a GNSS module powered by the battery and housed in the housing; and
wherein the memory further stores instructions that, when executed by the processing circuitry, cause the processing circuitry to:
if the attempt to initiate wireless communication to the at least one WiFi device, via the WiFi communications module, is unsuccessful, then attempt to determine a location of the first location tracking device via the GNSS module;
if the attempt to determine the location of the first location tracking device via the GNSS module is successful, then:
receive, via the GNSS module, GNSS data from a satellite constellation;
transmit, via the mobile data communications module, GNSS data to an external server for identifying a location of the first location tracking device based on the transmitted GNSS data; and
set an operational mode of the first location tracking device to the help mode to allow communication to at least one third location tracking device via the RF communications module;

The memory may further store instructions that, when executed by the processing circuitry, cause the processing circuitry to, if the attempt to determine the location of the first location tracking device via the GNSS module is unsuccessful, attempt to initiate wireless communication with the gateway device or the second location tracking device via the RF communications module until successful.

The first location tracking device may have a maximum dimension of about 50 mm and/or a maximum mass of about 100 grams. For example, the mass may be about 20 grams to about 100 grams.

The first location tracking device may have a maximum dimension of about 200 mm and/or a maximum mass of about 100 grams. For example, the mass may be about 20 grams to about 100 grams.

The first location tracking device may have a maximum dimension of about 200 mm and/or a maximum mass of about 300 grams. For example, the mass may be about 100 grams to about 300 grams.

Some embodiments relate to a system including the first location tracking device of any one of the embodiments described above and another first location tracking device of any one of the embodiments described above, wherein the first location tracking devices have communicated with each other.

The system may further include multiple ones of the first location tracking device of any one of the embodiments described above, wherein each of the first location tracking devices has communicated with at least another one of the first location tracking devices.

In such systems, the first location tracking devices may be configured to cooperate to establish a network of wirelessly connected first location tracking devices.

The system may further include an external server, wherein at least one of the first location tracking devices is configured to communicate with the external server.

Some embodiments relate to a kit comprising at least two of the first location tracking device of the embodiments described above, wherein the at least two first location tracking devices are configured to communicate with each other.

Some embodiments relate to a method of object location tracking including configuring multiple types of the first location tracking devices of any one of the embodiments described above to be wirelessly connectable with each other.

The method may further comprise locating each of the first location tracking devices on a respective object to be tracked. The method may further comprise receiving at a server device data from at least one of the first location tracking devices to enable location identification of the first location tracking devices.

Some embodiments relate to use of multiple ones of the first location tracking devices of any one of the embodiments described above to establish a network of wirelessly connected first location tracking devices to track the location of multiple of objects carrying respective first location tracking devices.

Some embodiments relate to a pallet carrying the first location tracking device of any one of the embodiments described above.

Some embodiments relate to a method of object location tracking of one object from among many objects in a same vicinity, the method including:

affixing a location tracking device to each of the one object and the many objects, the location tracking device being configured to:
  detect a movement state of the location tracking device;
  in response to detecting the movement state, establish a connection to identify itself to an external server; and
  if the connection is established, then allow connection with one or more other location tracking devices, so that the one or more other location tracking devices can be identified to the external server.

The location tracking device may be further configured to, if the connection is not established, disable all functionality of the location tracking device not required to detect the movement state of the location tracking device.

The method may further include, after the affixing, receiving at the external server device identification data from the location tracking device of the one object, wherein the device identification data uniquely identifies the one object.

The method may further include, after the affixing, receiving at the external server device identification data from the location tracking device of the one object and the location tracking devices of the many objects.

The device identification data from the location tracking devices of the many objects may be received from the location tracking device of the one object. The method may further include, after the receiving, accessing the external server to identify a location of the one object.

In such methods, the movement state may be detected based on output of a movement sensor in each location tracking device, wherein detection of the movement state includes detecting when the location tracking device has moved for a first minimum time period followed by no movement for a second minimum time period. The first minimum time period may be between about 5 seconds to about 30 seconds. The second minimum time period may be between about 5 seconds to about 30 seconds.

Some embodiments relate to a system for object location tracking including:
  multiple location tracking devices, each location tracking device carried by an object, the location tracking device being configured to:
    detect a movement state of the location tracking device;
    in response to detecting the movement state, establish a connection to identify itself to an external server; and
    if the connection is established, then allow connection with one or more other location tracking devices, so that the one or more other location tracking devices can be identified to the external server; and
  the external server, wherein the external server is configured to identify a location of each object based on a location of the respective identified location tracking device carried by the object.

Each location tracking device may include a movement sensor and the movement state may be detected based on output of the movement sensor. Detection of the movement state may include detecting when the location tracking device has moved for a first minimum time period followed by no movement for a second minimum time period. The first minimum time period may be between about 5 seconds to about 30 seconds. The second minimum time period may be between about 5 seconds to about 30 seconds.

BRIEF DESCRIPTION OF DRAWINGS

Embodiments of the present disclosure will now be described by way of non-limiting example only with reference to the accompanying drawings, in which.

DESCRIPTION OF EMBODIMENTS

Described embodiments of the present disclosure relate to location tracking devices and methods. In particular, embodiments relate to devices and methods for identifying and tracking the location of an object.

Tracking of individual objects, such as wooden pallets, amongst a plurality of objects, such as a stack of pallets, using individual devices carried by the objects can be extremely difficult. For example, the readable range of radio frequency signals of the devices carried by the pallets can be drastically reduced due to difficulty of the signals in penetrating the wooden pallets. Signals from devices amongst the stack of pallets may not be readable from a device external to the stack of pallets, but signals from devices on the outer edges of the stack of pallets may be readable. Further, devices amongst the stack of pallets may only be able to transmit a readable signal through one or two pallets in the stack before the signal becomes unreadable.

The following described embodiments relate to devices and methods for forming a mesh network of location tracking devices that can communicate with one another to allow devices amongst a plurality of objects, such as within the stack of pallets, that cannot transmit readable signals externally of the plurality of objects to instead transmit readable signals to other devices amongst the plurality of objects that can transmit readable signals externally. This allows devices that would not otherwise be able to transmit signals externally of the plurality of objects to transmit said signals externally via other devices amongst the plurality of objects.

Figure 1:
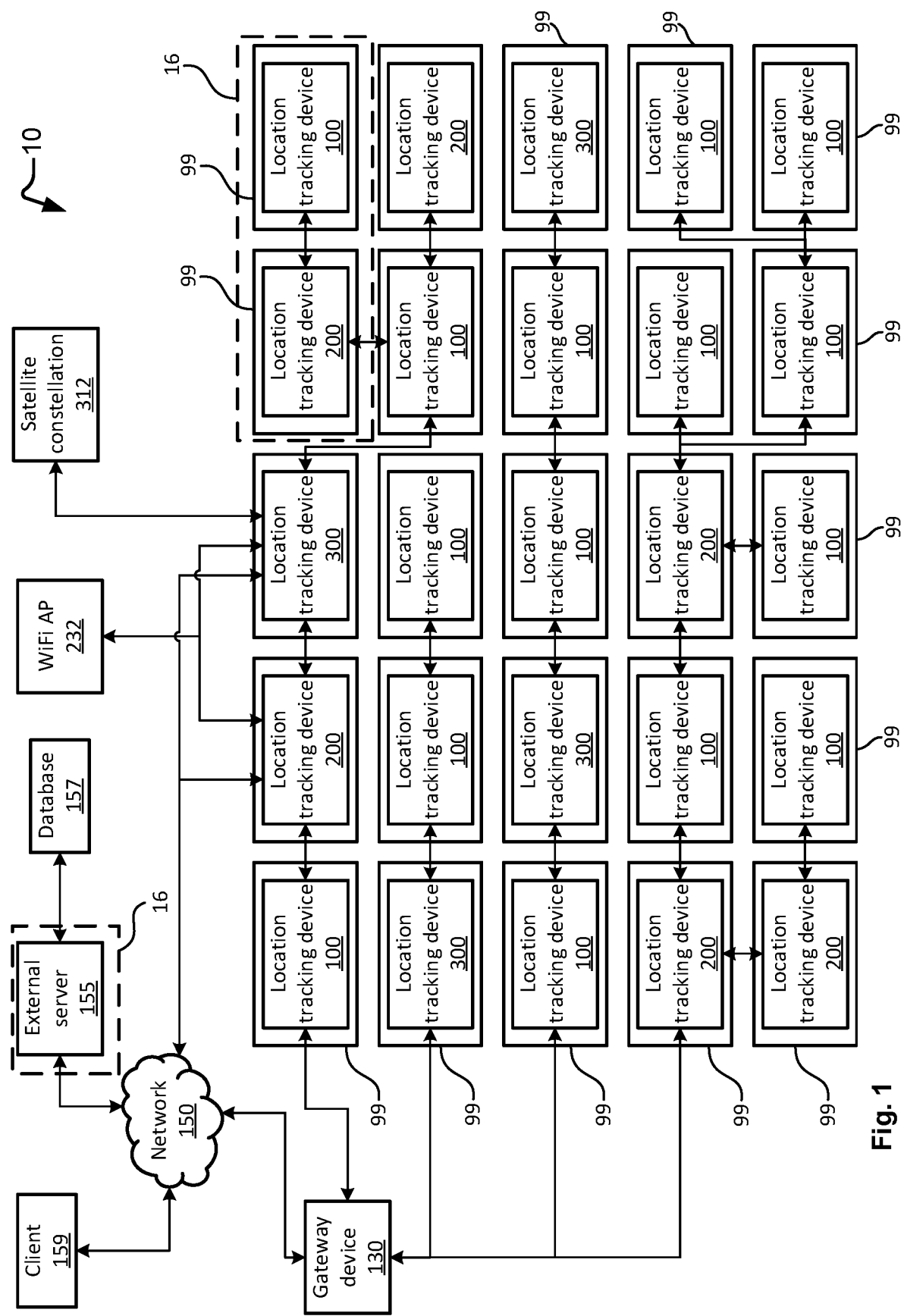
FIG. 1 is schematic illustration of a system of wirelessly connected location tracking devices, according to some embodiments.

Referring to FIG. 1, there is shown a system 10 of wirelessly connected location tracking devices 100, 200, 300, according to some embodiments. The system 10 comprises a plurality of objects, such as objects 99. The plurality of objects may be any one of a pallet, a trolley, a crate, or another object suitable for carrying goods, for example. For example, objects suitable for carrying goods to which an object location tracking device 100, 200, 300 may be coupled, affixed or otherwise located include: metal cages, shipping tanks, totes, crates or containers, metal and plastic material transport units, and durable plastic transport crates or tubs, such as intermediate bulk containers (IBCs). In some embodiments, the plurality of objects 99 are manufactured, at least in part, from any one of: steel, timber, and plastic. The objects 99 may or may not be the same kind of object.

Each object 99 carries a location tracking device 100, 200, 300 configured to allow identification of a location of the object 99. Each of the location tracking devices 100, 200, 300 are configured to communicate with other location tracking devices 100, 200, 300 in its vicinity using wireless communications. The wireless connected location tracking devices 100, 200, 300 are configured to form a mesh network of wirelessly connected location tracking devices 100, 200, 300. The mesh network of wirelessly connected location tracking devices 100, 200, 300 may allow for a location tracking device 100, 200, 300 to communicate with another location tracking device 100, 200, 300 via at least one another location tracking device 100, 200, 300 as an intermediary. That is, the location tracking devices 100, 200, 300 may communicate indirectly with other location tracking devices 100, 200, 300 via at least one another location tracking device 100, 200, 300, for example.

In some embodiments, location tracking device 200 includes location tracking device 100 and may further includes WiFi communication and mobile data communication functionalities. That is, location tracking device 200 is location tracking device 100 with WiFi communication and mobile data communication capabilities, for example. However, in alternative embodiments, location tracking device 200 does not require WiFi communication functionality, but only requires the ability to see which WiFi hubs or other WiFi routing devices (i.e. access points) are in the vicinity of the location tracking device 200 without establishing any communications link with such WiFi devices. This allows the location tracking device 200 to gather and send information that can be used by an external server to determine a location of the location tracking device 200. In some embodiments, location tracking device 300 includes location tracking device 200 and further includes global navigation satellite system communication functionality. That is, location tracking device 300 is location tracking device 200 with global navigation satellite system communication capability, for example.

In some embodiments, system 10 further comprises a gateway device 130. The gateway device 130 is a device that acts as a "gate" between the mesh network of wirelessly connected location tracking devices 100, 200, 300 and a network 150. Each of the location tracking devices 100, 200, 300 are further configured to communicate with the gateway device 130 using RF communications. The location tracking devices 100, 200, 300 are configured to transmit device data to the gateway device 130. The device data may include device identification data and configuration data (e.g. in the form of a configuration identifier) of the respective location tracking device 100, 200, 300, for example. For versions of location tracking device 100, 200, 300 that have a GPS module to determine their own location, the device data may include location data that specifies the current location of that device. Otherwise, a location of the location tracking device 100, 200, 300 is determined by an external server based on the location of other devices in the vicinity, such as a gateway device or a WiFi device. For example, a gateway device has a known location, so any device that can locally communicate with the gateway device via RF communications is assumed to be at or close to the location of the gateway device. If multiple gateway devices are accessible to a location tracking device 100, 200, 300, then the location of the location tracking device 100, 200, 300 is taken to be the location of the gateway that it is closest to, for example according to received signal strength.

In some embodiments, location data includes WiFi AP (access point) data. WiFi AP data may be publically available information relating to a WiFi access point, for example. In some embodiments, location data further includes global navigation satellite system (GNSS) data and assisted GNSS (AGNSS) data. Device identification data may include at least a device identification value of the respective location tracing device 100, 200, 300. That is, each location tracking device 100, 200, 300 stores device identification data including a unique identifier allowing the respective location tracking device 100, 200, 300 to be uniquely identified, for example.

In some embodiments, configuration data includes a configuration identifier (ID) and optionally also a stocktake schedule or period. The configuration identifier can be used by the external server to determine a current configuration set of the location tracking device 100, 200, 300, which allows the external server to determine whether a configuration update is required for that device. The configuration set corresponding to the configuration ID of the location tracking device 100, 200, 300 may specify, for example: how long the location tracking device 100, 200, 300 should scan for a gateway, once the movement state is detected; and how long to wait for movement and non-movement before determining that the movement state has been detected and that the device processing circuitry should "wake" up and try to identify itself.

The stocktake schedule or period may be separate from the configuration identifier. The stocktake schedule or period indicates at least one time or time period at which the location tracking device 100, 200, 300 should attempt to identify itself to an external server. In some embodiments, all location tracking devices 100, 200, 300 are configured to have the same stocktake schedule or period, so that all of the location tracking devices 100, 200, 300 attempt to identify themselves to the external server at or about the same time. For example, the location tracking devices 100, 200, 300 may be configured with a stocktake schedule time of 2300 hours GMT (Greenwich Mean Time) each day. This allows the location tracking devices 100, 200, 300 to effectively establish a network among themselves as needed, so that devices that would otherwise not be able to identify themselves from among a large number of devices or objects (e.g. due to noise and/or signal attenuation), can still get their device identification data out to the external server to have their locations identified.

The gateway device 130 may transmit device data to the location tracking devices 100, 200, 300, such as configuration data, to update or overwrite existing device data, for example. The mesh network of wireless connected location tracking devices 100, 200, 300 allows location tracking devices 100, 200, 300 unable to communicate directly with the gateway 130 to communicate indirectly with the gateway 130 via at least one another location tracking device 100, 200, 300. That is, a location tracking device 100, 200, 300 may receive device data, such as configuration data, from the gateway device 130 via at least one another location tracking device 100, 200, 300, for example.

Each (first) location tracking device 100, 200, 300 is configured to transmit device data to at least one other location tracking device 100, 200, 300 or the gateway device 130, and to offer to help other location tracking devices 100, 200, 300. If a communication connection is established with at least one other such location tracking device 100, 200, 300, then the first location tracking device 100, 200, 300 can receive device data from at least one other location tracking device 100, 200, 300. Each location tracking device 100, 200, 300 may receive data from up to a predetermined number (e.g. two to twenty) of other location tracking devices 100, 200, 300 simultaneously. That is, each location tracking device 100, 200, 300 may have up to twenty active connections simultaneously for transmitting and receiving data, for example. It is preferred to limit the predetermined number of active connections with other devices to a number less than 10, such as between 2 and 8, optionally around 5. This allows the device to conserve available energy in the battery, avoid exceeding its RAM (random access memory) limits and to limit the amount of message traffic in the area.

System 10 further comprises an external server 155. External server 155 may be a physical server or a cloud-based server. External server 155 may comprise processing circuitry and a memory accessible to the processing circuitry. The processing circuitry may be configured to access data stored in memory, to execute instructions stored in memory 143, and to read and write data to and from memory 143. External server 155 is connected to the network 150. That is, the external server 155 can be communicated with via network 150, for example. The external server 155 is configured to receive and transmit data via network 150.

In some embodiments, external server 155 is in communication with a database 157. In some embodiments, the external server 155 includes the database 157. The processing circuitry of the external server 155 may be configured to access data stored in database 157, to execute instructions stored in database 157, and to read and write data to and from database 157.

The gateway device 130 is configured to communicate with the external server 155 via the network 150. The gateway device 130 has a known physical location to the external server 155. The gateway 130 may transmit device data received from the location tracking devices 100, 200, 300 to the external server 155. The gateway 130 may receive device data from the external server to then transmit to the location tracking devices 100, 200, 300. In some embodiments, a client 159 may communicate with the external server 155 via network 150. The client 159 may be an owner of the plurality of objects, such as object 99, and can track their owned objects via a web interface hosted on the external server 155, for example.

Network 150 may comprise one or more local area networks or wide area networks that facilitate communication between elements of FIG. 1. For example, according to some embodiments, network 150 may include the internet. However, network 150 may comprise at least a portion of any one or more networks having one or more nodes that transmit, receive, forward, generate, buffer, store, route, switch, process, or a combination thereof, etc. one or more messages, packets, signals, some combination thereof, or so forth. Network 150 may include, for example, one or more of: a wireless network, a wired network, an internet, an intranet, a public network, a packet-switched network, a circuit-switched network, an ad hoc network, an infrastructure network, a public-switched telephone network (PSTN), a cable network, a cellular network, a satellite network, a fibre-optic network, or some combination thereof.

In some embodiments, system 10 further comprises at least one WiFi access point (AP) 232. Location tracking devices 200, 300 are further configured to wirelessly communicate with the at least one WiFi AP 232 via WiFi communications. Location tracking devices 200, 300 are further configured to communicate with the external server 155 via mobile data communications. In some embodiments, the location tracking device 200, 300 communicates with at least one WiFi AP 232 to obtain WiFi AP data relating to the at least one WiFi AP 232. In some embodiments, wireless communication with the at least one WiFi AP 232 comprises WiFi scanning to obtain WiFi AP data relating to the at least one WiFi AP 232. That is, the location tracking devices 200, 300 do not perform a handshake with the at least one WiFi AP 232, rather they obtain public information relating to the at least one WiFi AP 232 using WiFi scanning, for example.

The location tracking device 200, 300 then transmits the obtained WiFi AP data to the external server 155, via mobile data communications. In some embodiments, the external server 155 provides the received WiFi AP data to a geolocation API, or a WiFi fingerprinting API, such as Google's Geolocation API, to determine a location of the location tracking device 200, 300. That is, the external server 155 may determine the location of the location tracking device 200, 300 using WiFi fingerprinting, for example.

In some embodiments, system 10 further comprises a satellite constellation 312. Location tracking devices 300 are further configured to wirelessly communicate with the satellite constellation 312 via GNSS communications. In some embodiments, the location tracking device 300 may communicate with the satellite constellation 312, via GNSS communications, to obtain GNSS data. The GNSS data may be indicative of a geolocation of the location tracking device 300. In some embodiments, location tracking devices 300 are further configured to wirelessly communicate with the external server 155, via mobile data communications, to request AGNSS data from the external server 155. In some embodiments, AGNSS data reduces the time to first fix (TTFF) of the location tracking device 300. TTFF is a measure of the time required for the location tracking device 300 to acquire GNSS data from the satellite constellation 312.

In some embodiments, the external server 155 may transmit device data to the location tracking devices 100, 200, 300, such as configuration data, to overwrite existing device data, for example. The mesh network of wireless connected location tracking devices 100, 200, 300 allows location tracking devices 100, 200, 300 unable to communicate directly with the external server 155 to communicate indirectly with the external server 155 via at least one another location tracking device 100, 200, 300 that is in communication, either directly or indirectly, with a location tracking device 200, 300. That is, a location tracking device 100, 200, 300 may receive device data, such as configuration data, from the external server 155 via at least one other location tracking device 100, 200, 300 that is in direct, or indirect, communication with the external server 155 via location tracking device 200, 300, for example.

In some embodiments, system 10 is used to track the location of objects 99 using location tracking devices 100, 200, 300. Objects 99, being manufactured from signal-attenuating materials, such as steel or timber, may limit penetration of the wireless communication signals of the location tracking devices 100, 200, 300, thereby reducing the readable distance of the signals. In situations where a location tracking device 100, 200, 300 is attempting to communicate with the external server 155, but cannot do so directly, the location tracking device 100, 200, 300 may wireless communicate with another location tracking device 100, 200, 300 that is capable of initiating a wireless communication, either directly or indirectly, with the external server 155. That is, location tracking devices 100, 200, 300 with wireless communication signals affected by objects 99, causing reduced readable distance, may effectively (virtually) extend the readable distance of their signals using another location tracking device 100, 200, 300, for example.

In some embodiments, it is beneficial for system 10 to include a combination of different types of location tracking devices 100, 200, 300, so that the devices collectively include different functionality. In situations where the gateway 130 is not available at a location, location tracking devices 100 alone are unable to wirelessly communicate with the external server 155, resulting in their location being untrackable. Providing location tracking device 200, which the external server 155 can determine the location of using WiFi fingerprinting, at or near the location of the location tracking devices 100, enables the external server 155 to determine the location of the location tracking devices 100 via the location tracking device 200 if at least one WiFi AP 232 is available in the location.

In a situation where at least one WiFi AP 232 is unavailable, location tracking devices 100, 200 alone are unable to wirelessly communicate with the external server 155, resulting in their location being untrackable. Providing location tracking device 300, which can determine its location using GNSS data and AGNSS data that can be subsequently transmitted to the external server 155, at the location of the location tracking devices 100 enables the external server 155 to determine the location of the location tracking devices 100 via the location tracking device 300. In some embodiments, the external server 155 is configured to receive device data from any one of the gateway device 130 and the location tracking devices 200, 300. The external server 155 may determine the location of the location tracking devices 100, 200, 300 based at least in part on the received device data.

For example, a gateway device 130 may receive from a first location tracking device 100, 200, 300 device data, the device data including at least device identification data, of the first location tracking device 100, 200, 300 and a plurality of location tracking devices 100, 200, 300 in either direct or indirect wireless communication with the first location tracking device 200, 300. Indirect wireless communication is communication of a location tracking device 100, 200, 300 of the plurality of location tracking devices 100, 200, 300 with the first location tracking device 100, 200, 300 via at least one another of the plurality of location tracking devices 100, 200, 300. The gateway device 130 may then transmit the device data of the first location tracking device 100, 200, 300 and the plurality of location tracking devices 100, 200, 300 to the external server 155. The external server 155, knowing the location of the gateway device 130, then assigns the first location tracking device 100, 200, 300 and each location tracking device 100, 200, 300 of the plurality of location tracking devices 100, 200, 300 indicated by the received device identification data, to the location of the gateway device 130.

For example, the external server 155 may receive, from a first location tracking device 200, 300 via mobile data communications, WiFi AP data retrieved by the first location tracking device 200, 300 from at least one WiFi AP 232 at its respective location. The external server 155 may then receive from the first location tracking device 200, 300 via mobile data communications, device data including device identification data, of the first location tracking device 200, 300 and a plurality of location tracking devices 100, 200, 300 in either direct or indirect wireless communication with the first location tracking device 200, 300. Indirect wireless communication is communication of a location tracking device 100, 200, 300 of the plurality of location tracking devices 100, 200, 300 with the first location tracking device 200, 300 via at least one another of the plurality of location tracking devices 100, 200, 300. The external server 155 then determines the location of the first location tracking device 200, 300 via WiFi fingerprinting, and assigns the first location tracking device 200, 300 and each location tracking device 100, 200, 300 of the plurality of location tracking devices 100, 200, 300 indicated by the received device identification data, to the determined location of the first location tracking device 200, 300.

For example, the external server 155 may receive, from a first location tracking device 300 via mobile data communications, GNSS data retrieved by the first location tracking device 300 from a satellite constellation 312 indicating a location of the first location tracking device 300. The external server 155 may then receive from the first location tracking device 300 via mobile data communications, device data including device identification data, of the first location tracking device 300 and a plurality of location tracking devices 100, 200, 300 in either direct or indirect wireless communication with the first location tracking device 300. Indirect wireless communication is communication of a location tracking device 100, 200, 300 of the plurality of location tracking devices 100, 200, 300 with the first location tracking device 300 via at least one another of the plurality of location tracking devices 100, 200, 300. The external server 155, then determines the location of the first location tracking device 300 using the received GNSS data, and assigns the first location tracking device 300 and each location tracking device 100, 200, 300 of the plurality of location tracking devices 100, 200, 300 indicated by the received device identification data, to the determined location of the first location tracking device 300.

Identification of the location of the objects 99 may include the location tracking devices 100, 200, 300 identifying themselves to the external server 155. The external server 155 may then determine the location of the location tracking devices 100, 200, 300, and in turn their respective objects 99, based on the method of identification, such as the gateway device 130, via WiFi AP 232 scanning, or GNSS data. That is, the external server 155 may determine the location of location tracking devices 100, 200, 300 and their respective objects 99 based on how the location tracking devices 100, 200, 300 identify themselves with the external server 155, for example.

In some embodiments, multiple ones of the location tracking device 100, 200, 300 are provided to establish system 10, being a network of wirelessly connected location tracking devices 100, 200, 300 to track the location of multiple objects carrying respective location tracking devices 100, 200, 300. The system 10 may include the external server 155 in combination with multiple ones of the location tracking devices 100, 200, 300.

Figure 2:
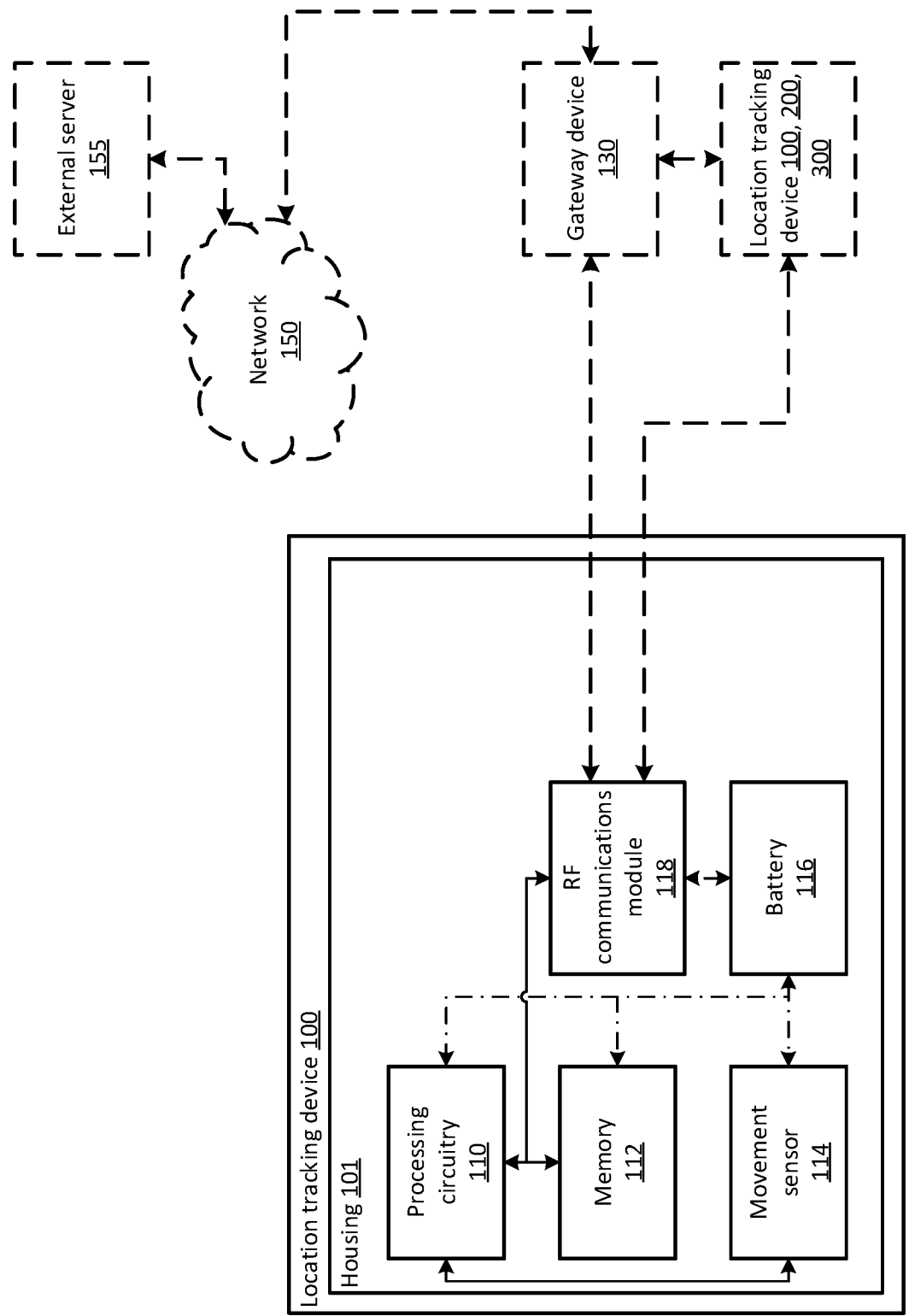
FIG. 2 is a schematic illustration of a location tracking device of FIG. 1, according to some embodiments.
Figure 3:
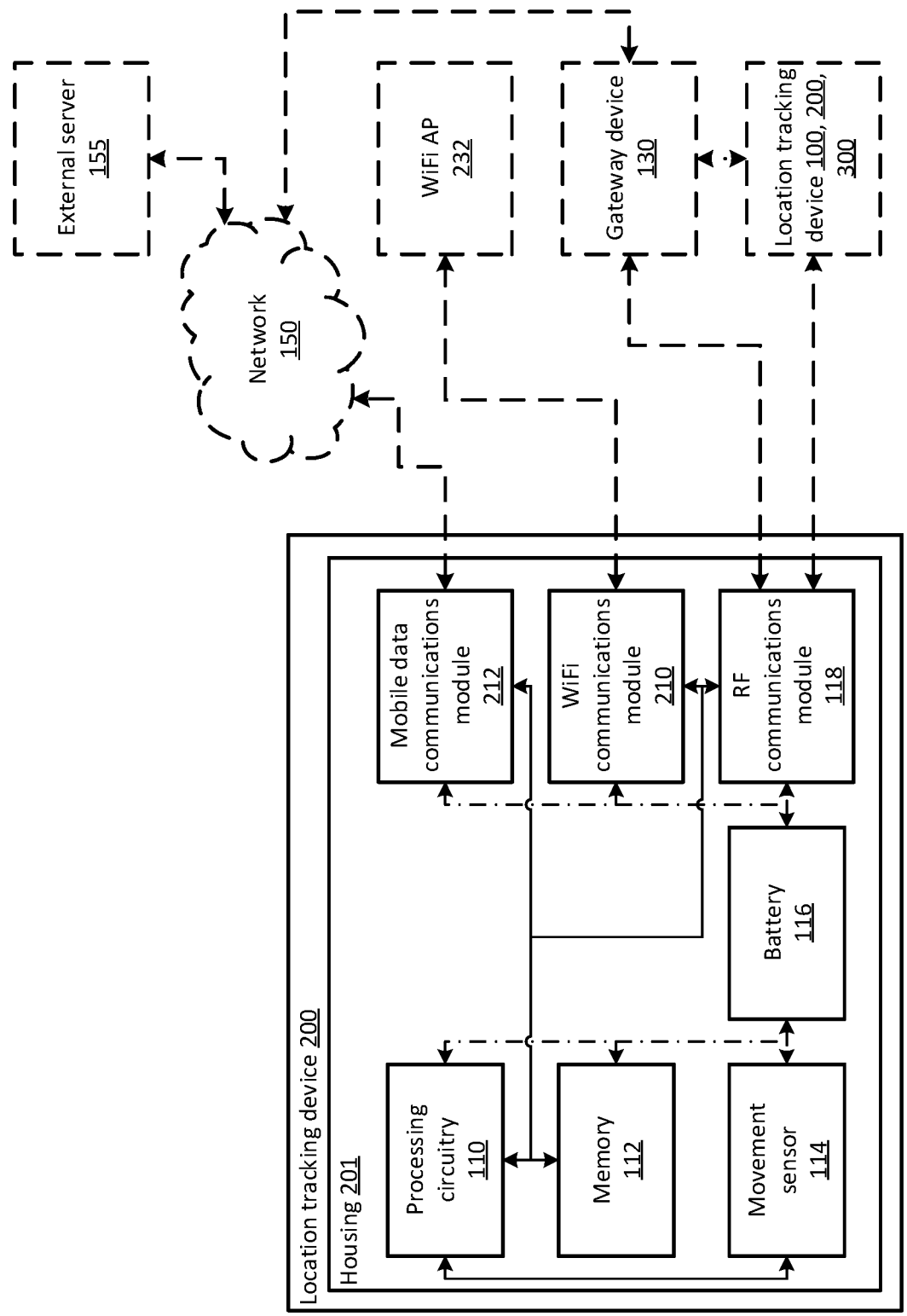
FIG. 3 is a schematic illustration of a location tracking device of FIG. 1, according to some further embodiments.
Figure 4:
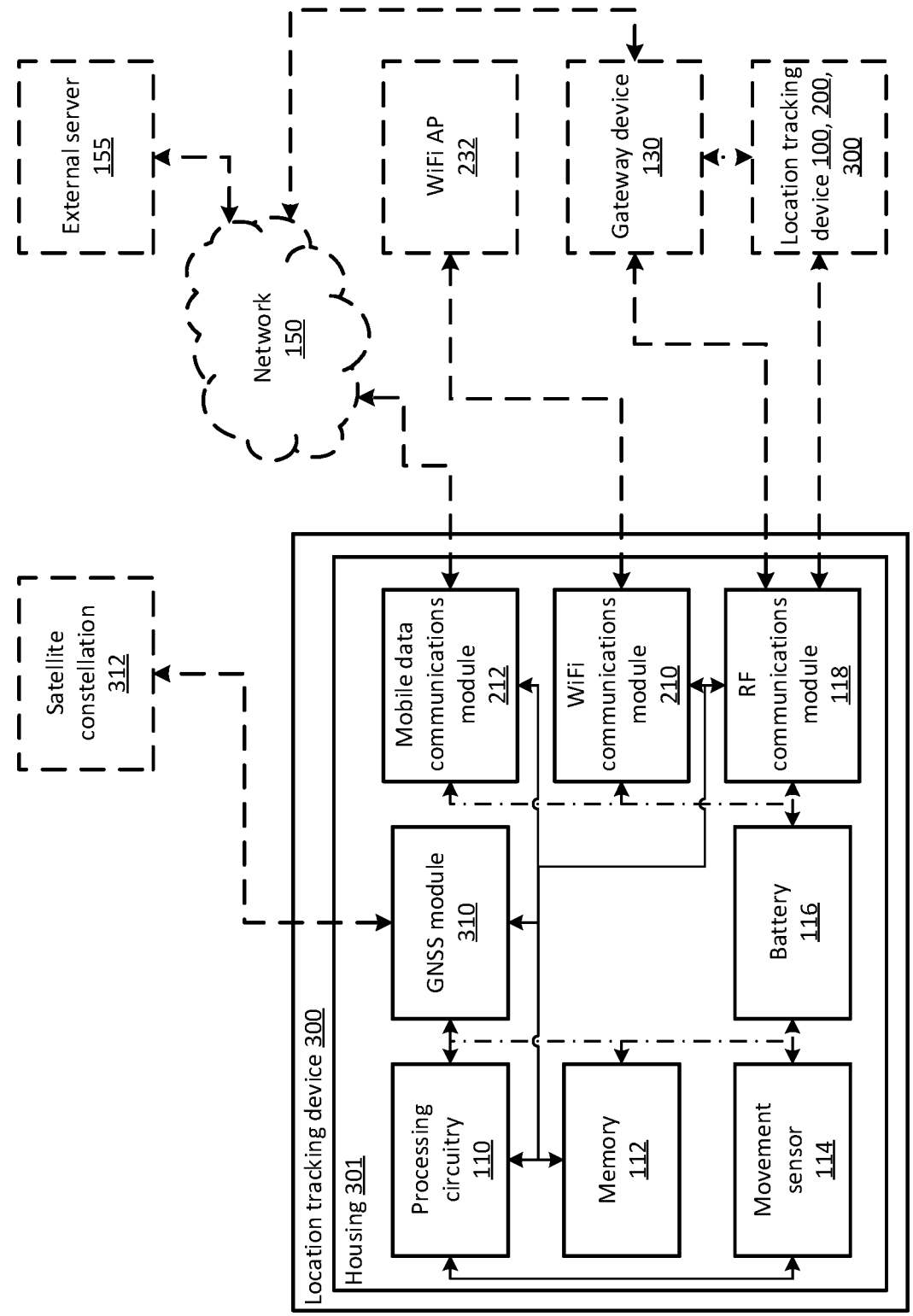
FIG. 4 is a schematic illustration of a location tracking device of FIG. 1, according to still further embodiments.

FIGS. 2, 3, and 4 are schematic illustrations of location tracking device 100, location tracking device 200, and location tracking device 300, respectively, of FIG. 1, according to various embodiments. Location tracking devices 100, 200, and 300 comprises processing circuitry 110 and a memory 112 accessible to the processing circuitry 110. Processing circuitry 110 may be configured to access data stored in memory 112, to execute instructions stored in memory 112, and to read and write data to and from memory 112. Processing circuitry 110 may comprise one or more microprocessors, microcontrollers, central processing units (CPUs), application specific instruction set processors (ASIPs), or other processor capable of reading and executing instruction code.

Memory 112 may comprise one or more volatile or non-volatile memory types, such as RAM, ROM, EEPROM, or flash, for example. Memory 112 may be configured to store executable applications or instruction code for execution by the processing circuitry 110. Memory 112 may store device data, such as location data, device identification data, and configuration data of the location tracking device 100.

Location tracking devices 100, 200, and 300 further comprise a movement sensor 114 accessible to the processing circuitry 110. The movement sensor 114 is configured to monitor, detect, or measure the movement of the location tracking device 100, 200, 300. In some embodiments, the movement sensor 114 is an accelerometer. The accelerometer may be a LIS2DW12 from STMicroelectronics, for example. In some embodiments, the movement sensor 114 is configured to draw minimal power when monitoring, detecting, or measuring. In some embodiments, the movement sensor 114 has a power consumption of between about 30 nanoAmperes (e.g. in a power-down mode) to about 1 microAmpere (e.g. in a normal but low power operational mode), for example. An example of a suitable movement sensor is the LIS2DW12 MEMS digital output motion sensor from STMicroelectronics, which is described as an ultra-low power consumption device. For example, the movement sensor may consume around 50 nA in power-down mode and about 1 microAmpere in low power mode.

Location tracking devices 100, 200 and 300 further comprise a RF communications module 118 accessible to the processing circuitry 110. The RF communications module 118 may facilitate communication of the location tracking device 100, 200, 300 with other location tracking devices 100, 200, 300 and/or the gateway device 130. In some embodiments, the RF communications module 118 is configured to use a protocol, such as a Bluetooth protocol, Zigbee protocol, WiFi protocol or DECT (digital enhanced cordless telecommunications) for RF communication. In some embodiments, the RF communications module 118 is configured to use Bluetooth Low Energy (BLE) protocol for RF communications. In some embodiments, the processing circuitry 110, memory 112, and the RF communications module 118 are included in a system on chip (SoC), such as a EFR32BG22 from Silicon Labs, for example.

Location tracking devices 200 and 300 further comprise a WiFi communications module 210 accessible to the processing circuitry 110. The WiFi communications module 210 may facilitate communication of the location tracking device 200, 300 with at least one WiFi AP 232. In some embodiments, the WiFi communications module 210 is an SoC, such as a ESP8684 from Espressif Systems, for example.

Location tracking devices 200 and 300 further comprise a mobile data communications module 212. The mobile data communications module 212 may facilitate communication of the location tracking device 200, 300 with the external server 155. In some embodiments, the mobile data communications module 212 is an LTE Cat NB2 module, such as a BC660K-GL from Quectel, for example. In other embodiments, the mobile data communications module 212 may be a CAT-3, CAT-2, CAT-M1 or CAT-NB1 module, for example.

Location tracking device 300 further comprises a GNSS module 310. The GNSS module 310 facilitates communication of the location tracking device 300 with the satellite constellation 312. The GNSS module 310 allows the location tracking device 300 to determine its geolocation. In some embodiments, the GNSS module 310 may be an LC76G from Quectel, for example.

Location tracking devices 100, 200 and 300 further comprise a battery 116 for supplying power to the elements of the respective location tracking devices. Battery 116 of location tracking device 100 supplies power to the processing circuitry 110, the memory 112, the movement sensor 114 and the RF communications module 118. Battery 116 of location tracking device 200 supplies power to the processing circuitry 110, the memory 112, the movement sensor 114, the RF communications module 118, the WiFi communications module 210, and the mobile data communications module 212. Battery 116 of location tracking device 200 supplies power to the processing circuitry 110, the memory 112, the movement sensor 114, the RF communications module 118, the WiFi communications module 210, the mobile data communications module 212, and the GNSS module 310.

In some embodiments, the battery 116 of location tracking device 100 is a lithium battery, such as a CR2023 battery, for example. In some embodiments, location tracking device 100 may include a plurality of batteries 116. That is, location tracking device 100 may include at least two CR2032 batteries, for example. The battery 116 of location tracking device 100 may have a capacity of at least 200 mAh (at 2 Volts), for example. The battery 116 of location tracking device 100 may have a capacity of 235 mAh (at 2 Volts), for example. In some embodiments, the battery 116 of location tracking device 100 is non-rechargeable. That is, the location tracking device 100 may not be a rechargeable device, for example.

In some embodiments, the battery 116 of location tracking device 200 is a lithium-ion battery. The battery 116 of location tracking device 200 may be a lithium-ion bag battery, for example. In some embodiments, location tracking device 200 may include a plurality of batteries 116. That is, location tracking device 200 may include at least two lithium-ion batteries, for example. The battery 116 of location tracking device 200 may have a capacity of at least 1500 mAh, for example. The battery 116 of location tracking device 200 may have a capacity of 2000 mAh, for example. In some embodiments, the battery 116 of location tracking device 200 is non-rechargeable. That is, the location tracking device 200 may not be a rechargeable device, for example.

In some embodiments, the battery 116 of location tracking device 300 is a lithium-ion battery. The battery 116 of location tracking device 300 may be a lithium-ion bag battery, for example. In some embodiments, location tracking device 300 may include a plurality of batteries 116. That is, location tracking device 300 may include at least two lithium-ion batteries, for example. The battery 116 of location tracking device 300 may have a capacity of at least 8000 mAh, for example. The battery 116 of location tracking device 300 may have a capacity of 10000 mAh, for example. In some embodiments, the battery 116 of location tracking device 300 is non-rechargeable. That is, the location tracking device 300 may not be a rechargeable device, for example.

In some embodiments, battery 116 may supply power to the processing circuitry 110 and memory 112 via a high efficiency step-up converter with ultra-low quiescent current, such as an ETA1061, for example. In some embodiments, battery 116 may supply power to the RF communications module 118 via a high efficiency step-up converter with ultra-low quiescent current, such as an ETA1061, for example. In some embodiments, battery 116 may supply power to the WiFi communications module 210 via a high efficiency step-up converter with ultra-low quiescent current, such as an ETA1061, for example. In some embodiments, battery 116 may supply power to the mobile data communications module 212 via a high efficiency step-up converter with ultra-low quiescent current, such as an ETA1061, for example. In some embodiments, battery 116 may supply power to the GNSS module 310 via a high efficiency step-up converter with ultra-low quiescent current, such as an ETA1061, for example.

Location tracking devices 100, 200 and 300 further comprise housings 101, 201, and 301, respectively, for housing the elements of the respective location tracking devices. Housing 101 of location tracking device 100 houses the processing circuitry 110, the memory 112, the movement sensor 114 and the RF communications module 118. Housing 201 of location tracking device 200 houses the processing circuitry 110, the memory 112, the movement sensor 114, the RF communications module 118, the WiFi communications module 210, and the mobile data communications module 212. Housing 301 of location tracking device 300 houses the processing circuitry 110, the memory 112, the movement sensor 114, the RF communications module 118, the WiFi communications module 210, the mobile data communications module 212, and the GNSS module 310. The location tracking device 100 is generally the smallest, while the location tracking device 300 is the largest and the location tracking device 200 is medium sized, in between the sizes of the devices 100 and 300. However, the difference in sizes is primarily a result of the different componentry and functionality they carry, and so in some embodiments, the dimensions and/or mass of the different forms of the location tracking devices 100, 200, 300 may have some overlap or similarity. The location tracking device 100 may be somewhat circular, but in other embodiments may be roughly square, for example. The location tracking device 200 may be approximately square or rectangular or may be rounded, for example. The location tracking device 300 may be approximately rectangular, for example.

In some embodiments, the housings 101, 201, and 301 are manufactured from a suitable plastic material or other synthetic material. Examples of suitable plastics include polycarbonate and high density polyethylene (HDPE). The housing 101 of the location tracking device 100 may be sized to have a maximum dimension (e.g. length, width, depth or diameter) of around 50 mm. For example, a diameter or length of the housing 101 may be about 20 mm to about 50 mm. In some embodiments, the diameter or length of the housing 101 of the location tracking device 100 is about 24 mm. The housing 101 of the location tracking device 100 may have a width of about 20 mm to about 50 mm, for example. In some embodiments, the width of the housing 101 of the location tracking device 100 is about 24 mm. The housing 101 of the location tracking device 100 may have a height or thickness of about 10 mm to about 30 mm, for example. In some embodiments, the height or thickness of the housing 101 of the location tracking device 100 is about 12 mm. A mass of the location tracking device 100 may be up to about 100 grams. For example, the mass may be between about 20 grams and about 100 grams.

The housing 201 of the location tracking device 200 may be sized to have a maximum dimension (e.g. length, width, depth or diameter) of around 200 mm. For example, a length of the housing 201 may be about 25 mm to about 200 mm. In some embodiments, the length of the housing 201 of the location tracking device 200 is about 40 mm to 60 mm, optionally about 47 mm. The housing 201 of the location tracking device 200 may have a width of about 25 mm to about 100 mm, for example. In some embodiments, the width of the housing 201 of the location tracking device 200 is about 40 mm to about 60 mm, optionally about 44 or 45 mm. The housing 201 of the location tracking device 200 may have a height or thickness of about 10 mm to about 30 mm, for example. In some embodiments, the height or thickness of the housing 201 of the location tracking device 200 is about 20 mm. A mass of the location tracking device 200 may be up to about 100 grams. For example, the mass may be between about 20 grams and about 100 grams.

The housing 301 of the location tracking device 300 may be sized to have a maximum dimension (e.g. length, width, depth or diameter) of around 200 mm. For example, a length of the housing 301 may be about 70 mm to about 200 mm. In some embodiments, the length of the housing 301 of the location tracking device 300 is about 140 mm. The housing 301 of the location tracking device 300 may have a width of about 40 mm to about 100 mm, for example. In some embodiments, the width of the housing 301 of the location tracking device 300 is about 80 mm. The housing 301 of the location tracking device 300 may have a height or thickness of about 10 mm to about 30 mm, for example. In some embodiments, the height or thickness of the housing 301 of the location tracking device 300 is about 20 mm. A mass of the location tracking device 300 may be up to about 300 grams. For example, the mass may be between about 100 grams and about 300 grams.

In some embodiments, location tracking device 100, 200, 300 is coupled to the object 99 via any one of: adhesion, mechanical fastening, and retention within a chamber of the object 99, for example. In some embodiments, coupling of location tracking device 100, 200, 300 to the object 99 includes a combination of at least two of: adhesion, mechanical fastening, and retention within a chamber of the object 99. Adhesion may include the use of at least one of: paste adhesive, liquid adhesive, film adhesive, and pellet adhesive, for example. Mechanical fastening may include the use of at least one of: screws, nails, nuts and bolts, zipties, rivets, and clamps, for example.

Figure 5:
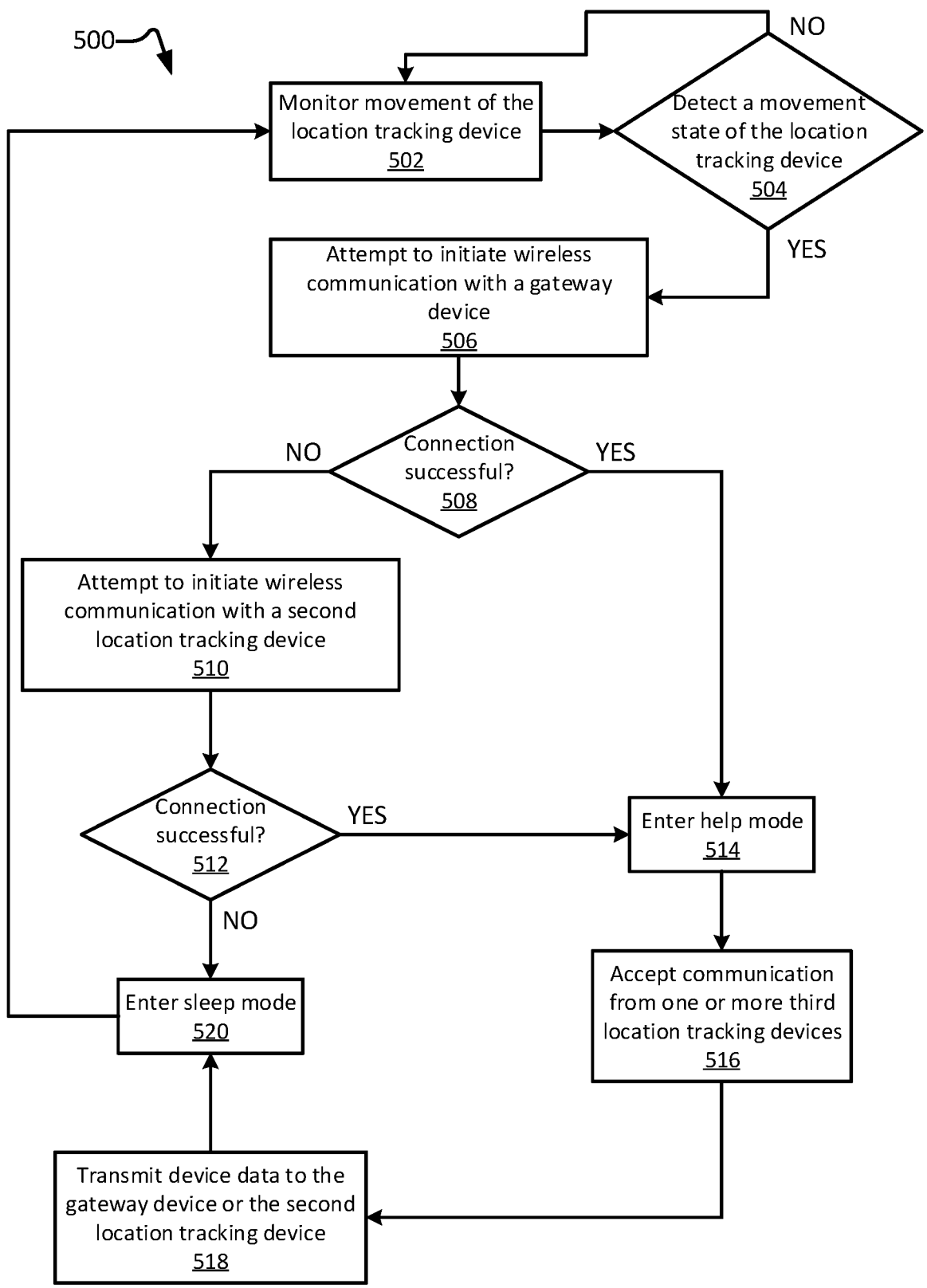
FIG. 5 is a process flow diagram of a method of determining the location of the location tracking device of FIG. 2, according to some embodiments.

Referring to FIG. 5, there is shown a process flow diagram of a method 500 of determining the location of the location tracking device 100 of FIG. 2, hereinafter referred to as a "first location tracking device 100", according to some embodiments. At step 502 of method 500, processing circuitry within the movement sensor 114 executes instructions, stored in its local memory, to cause an accelerometer component of the movement sensor 114 to monitor the movement of the first location tracking device 100. This monitoring is performed while the movement sensor 114 is in a power-down mode that uses very little of its battery power.

At step 504, the processing circuitry of the movement sensor 114 detects, based on the output of the accelerometer, a movement state of the first location tracking device 100. Upon detecting the movement state, the movement sensor 114 generates and sends a signal to the processing circuitry 110 of the first location tracking device 100 to indicate that the movement state has been detected. In response to this detection of the movement state, the processing circuitry 110 causes the first location tracking device 100 to "wake up" from its sleep mode. In some embodiments, the movement state of the first location tracking device 100 comprises movement of the first location tracking device 100 for a first minimum time period immediately followed by no movement of the first location tracking device 100 for a second minimum time period. The movement state may also be described as a movement event, since it requires multiple conditions to be satisfied, namely a movement period for a certain time period, immediately followed by a non-movement period for another time period. If these conditions are not satisfied, then the movement state (or event) is not detected.

In some embodiments, the first minimum time period and the second minimum time period are the same. In some embodiments, the first minimum time period and the second minimum time period are different. In some embodiments, the first minimum time period is between about 5 seconds and about 30 seconds. In some embodiments, the first minimum time period is between about 8 seconds and about 15 seconds. In some embodiments, the first minimum time period is about 10 seconds. In some embodiments, the second minimum time period is between about 5 seconds and about 30 seconds. In some embodiments, the second minimum time period is between about 8 seconds and about 15 seconds. In some embodiments, the second minimum time period is about 10 seconds.

If the processing circuitry of the movement sensor 114 does not detect the movement state of the location tracking device 100, method 500 proceeds back to step 502. That is, steps 502 and 504 of method 500 will be repeated until the processing circuitry of the movement sensor 114 detects a movement state of the first location tracking device 100, for example. If the processing circuitry of the movement sensor 114 detects the movement state of the first location tracking device 100, method 500 proceeds to step 506.

Steps 502 and 504 of method 500 may be performed in an operational mode referred to as a sleep mode. The sleep mode is an operational mode of the location tracking device 100 in which the location tracking device 100 preserves life of the battery 116 by minimising functions that are not required for detecting the movement state. That is, location tracking device 100 may disable functions not required for detecting the movement state to reduce power consumption and extend the life of the battery 116, for example.

In some embodiments, in the sleep mode RF communication functions of the location tracking device 100 are disabled. In some embodiments, in the sleep mode, all functions of the location tracking device 100 not required in detecting the movement state are disabled. That is, any function of the location tracking device 100 not required to monitor movement of the location tracking device 100 via the movement sensor 114 and to detect the movement state is disabled, for example.

At step 506, the processing circuitry 110 executes instructions, stored in memory 112, to cause the first location tracking device 100 to attempt to initiate communication with the gateway device 130 via the RF communications module 118. In some embodiments, the first location tracking device 100 attempts to initiate communication with the gateway device 130 using a low power short-range wireless radio frequency communication protocol, such as BLE. The first location tracking device 100 attempts to initiate communication with the gateway device 130 for a first maximum time period. The first maximum time period may be between about 200 milliseconds to about 2 seconds, optionally around 500 milliseconds, for example.

At step 508, the processing circuitry determines whether initiating communication with the gateway device 130 was successful. If the connection is successful, method 500 proceeds to step 514, to be described in detail below. If the connection is unsuccessful, method 500 proceeds to step 510.

At step 510, the processing circuitry 110 executes instructions, stored in memory 112, to cause the first location tracking device 100 to attempt to initiate wireless communication with a second location tracking device 100, 200, 300 via the RF communications module 118. The first location tracking device 100 attempts to initiate communication with the second location tracking device 100, 200, 300 for a second maximum time period. The second maximum time period may be between about 200 milliseconds to about 2 seconds, optionally about 500 milliseconds to about 1 second, for example.

The second location tracking device 100, 200, 300 may be a location tracking device 100, 200, 300 that has a direct communication channel, or an indirect communication channel via other location tracking device 100, 200, 300, to the gateway device 130 which communicates with the external server 155. The second location tracking device 100, 200, 300 may be a location tracking device 200, 300 that has a direct communication channel to the external server 155 via the mobile data communications module 212. The second location tracking device 100, 200, 300 may be a location tracking device 100, 200, 300 that has an indirect communication channel via other location tracking device 100, 200, 300, to a location tracking device 200, 300 that has a direct communication channel to the external server 155 via the mobile data communications module 212.

In some embodiments, the first location tracking device 100 attempts to initiate wireless communication with the second location tracking device 100, 200, 300 using a low power short-range wireless radio frequency communication protocol, such as BLE. At step 512, the processing circuitry 110 determines whether initiating communication with the second location tracking device 100, 200, 300 was successful. If the connection is unsuccessful, method 500 proceeds to step 520, to be described in detail below. If the connection is successful, method 500 proceeds to step 514.

At step 514, the processing circuitry 110 executes instructions, stored in memory 112, to set the operational mode of the first location tracking device 100 to a help mode. The first location tracking device 100 enters the help mode if a connection to either the gateway 130 or the second location tracking device 100, 200, 300 is established. The help mode is an operational mode of the location tracking device 100, 200, 300 in which the location tracking device 100, 200, 300 offers assistance to other location tracking devices 100, 200, 300 performing step 510. That is, the help mode is a mode in which the location tracking device 100, 200, 300, having a communication channel with the external server 155, offers to extend that communication channel to other location tracking devices 100, 200, 300 attempting to transmit their device data to the external server 155, for example.

After entering the help mode, method 500 proceeds to step 516. At step 516, the processing circuitry 110 executes instructions, stored in memory 112, to cause the first location tracking device 100 to allow communication with one or more third location tracking devices 100, 200, 300 for a third minimum time period. In some embodiments, the third minimum time period is between about 1 second and about 30 seconds. In some embodiments, the third minimum time period is between about 5 seconds to about 20 seconds, optionally about 10 seconds. The processing circuitry 110 executes instructions, stored in memory 112, to cause the first location tracking device 100 to allow for a further maximum time period, such as a period of between about 30 seconds to about 120 seconds, within which to communicate data from the first location tracking device 100 and data received from all connected third location tracking devices 100, 200, 300 to the gateway device 130.

In some embodiments, the first location tracking device 100 allows simultaneous communication with a maximum number of third location tracking devices 100, 200, 300. The maximum number of third location tracking devices 100, 200, 300 may be between 2 and 19, for example. In some embodiments, the third location tracking device 100, 200, 300 communicates with the first location tracking device 100 using a low power short-range wireless radio frequency communication protocol, such as BLE.

To allow communication with one or more third location tracking devices 100, 200, 300, the processing circuitry executes instructions, stored in memory 112, to cause the first location tracking device 100 to advertise that it is allowing wireless communication for a fourth time period, and to then scan for wireless communication requests for a fifth time period. In some embodiments the fourth time period is between about 10 ms and about 30 ms. In some embodiments, the fourth time period is about 20 ms. In some embodiments the fifth time period is between about 30 ms and about 50 ms. In some embodiments, the fifth time period is about 40 ms.

If no third location tracking devices 100, 200, 300 initiate communication with the first location tracking device 100 during the third minimum time period, method 500 proceeds to step 518. If one or more third location tracking devices 100, 200, 300 initiate communication with the first location tracking device 100, the first location tracking device 100 maintains the connection, waiting to receive device data from the connected one or more third location tracking devices 100, 200, 300. The first location tracking device 100 maintains the connection for a first timeout period or until it receives the device data from the third location tracking device 100, 200, 300 (whichever happens first), after which the first location tracking device 100 terminates the connection. The first timeout period may be up to 60 seconds, for example, or in other examples it may be about 20, 10 or about 2 seconds. A second timeout period may apply from a time at which the first location tracking device 100 enters the help mode. The second timeout period may be approximately double the first timeout period, for example. The second timeout period may be up to 100 or 120 seconds, for example, or in other examples it may be around 80, 60, 40, 30, 20, 10, 5 or 4 seconds. After the second timeout period expires, the first location tracking device 100 ceases to operate in the help mode, does not permit new connections with third location tracking devices 100, 200, 300 and terminates any existing connections, including any connections with any second location tracking devices 100, 200, 300.

The received device data from the one or more third location tracking devices 100, 200, 300 comprises device data of the respective one or more third location tracking device 100, 200, 300. In some embodiments, the received device data from the one or more third location tracking devices 100, 200, 300 further comprises device data of one or more other location tracking device 100, 200, 300. That is, the one or more third location tracking devices 100, 200, 300 may have previously received device data from other location tracking devices 100, 200, 300 attempting to transmit their device data to the external server 155, for example.

Upon receiving device data from a third location tracking device 100, 200, 300 of the one or more third location tracking device 100, 200, 300 in communication with the first location tracking device 100, the third location tracking device 100, 200, 300 terminates the wireless connection with the first location tracking device 100. The third location tracking device 100, 200, 300 having terminated the wireless connection, allows an additional third location tracking device 100, 200, 300 to initiate wireless communication with the first location tracking device 100. In some embodiments, one or more third location tracking devices 100, 200, 300 may timeout or lose connection to the first location tracking device 100. The one or more third location tracking devices 100, 200, 300 may attempt to reinitiate wireless communication with the first location tracking device 100 or another location tracking device 100, 200, 300.

When the first location tracking device 100 no longer has any of the one or more third location tracking devices 100, 200, 300 connected via wireless communications, method 500 proceeds to step 518. That is, when all of the one or more third location tracking device 100, 200, 300 have disconnected from the first location tracking device 100, method 500 proceeds to step 518, for example.

At step 518, the processing circuitry 110 executes instructions, stored in memory 112, to cause the first location tracking device 100 to transmit device data of the first location tracking device 100 and any received device data from the one or more third location tracking devices 100, 200, 300 to the connected wireless communication device, being the gateway device 130 or the second location tracking device 100, 200, 300. In some embodiments, the first location tracking device 100 only transmits device data and received device data including identification data. After transmitting the device data and any received device data, the processing circuitry 110 of the first location tracking device 100 executes instructions, stored in memory 112, to cause the RF communications module 118 of first location tracking device 100 to terminate the successfully initiated communication channel with the gateway device 130 or the second location tracking device 100, 200, 300, and method 500 proceeds to step 520.

At step 520, the processing circuitry 110 executes instructions, stored in memory 112, to set the operational mode of the first location tracking device 100 to the sleep mode.

Figure 6:
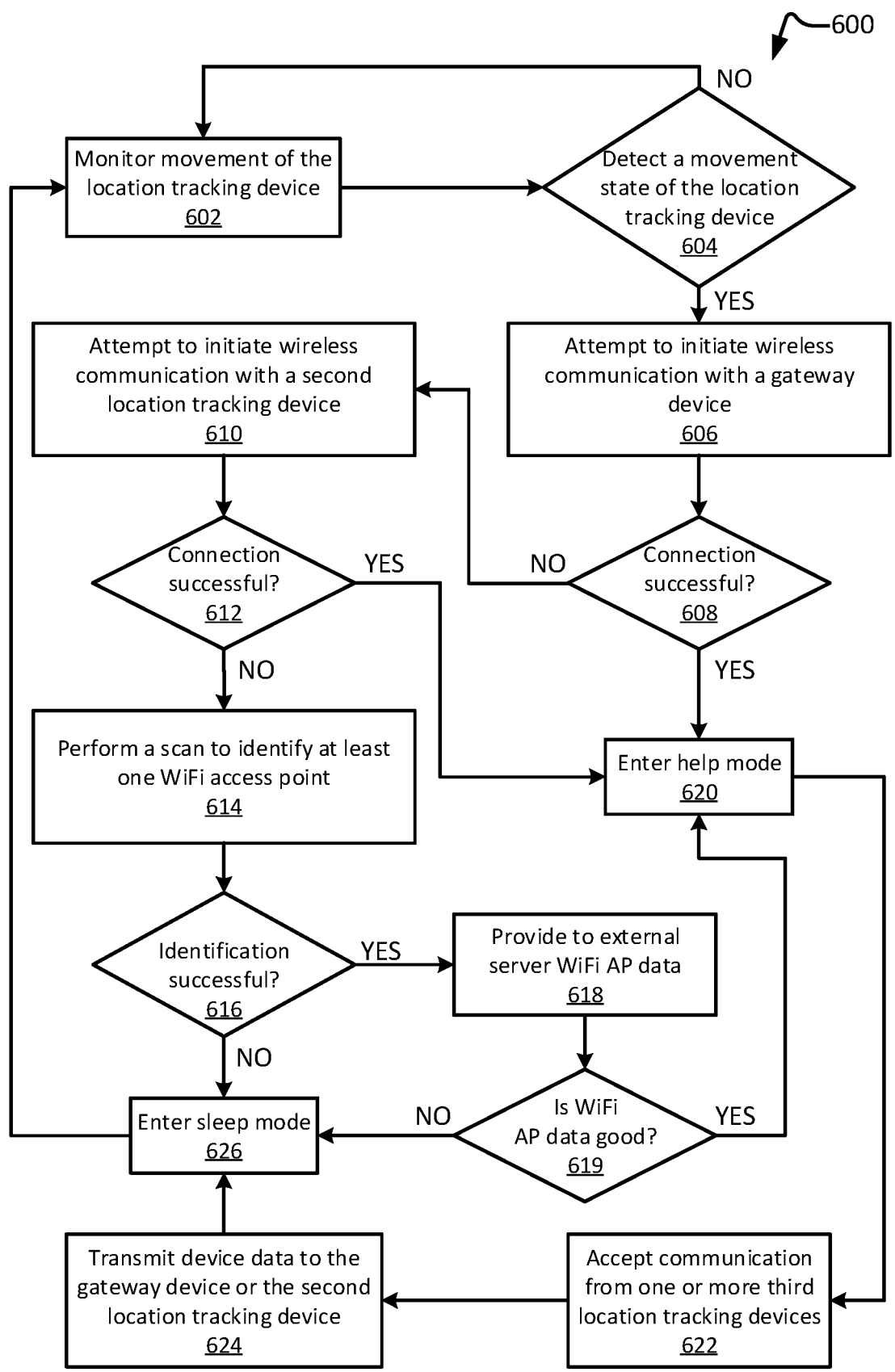
FIG. 6 is a process flow diagram of a method of determining the location of the location tracking device of FIG. 3, according to some embodiments.

Referring to FIG. 6, there is shown a process flow diagram of a method 600 of determining the location of the location tracking device 200 of FIG. 3, hereinafter referred to as a "first location tracking device 200", according to some embodiments. Steps 602 to 610 of method 600 of the first location tracking device 200 correspond to steps 502 to 510 of method 500 of the first location tracking device 100, respectively, the description of which is not repeated here for simplicity. Location tracking devices 200 have all of the functionality of location tracking devices 100, plus additional hardware and functionality to perform the method 600, as described.

Steps 602 and 604 of method 600 may be referred to as a sleep mode. The sleep mode is an operational mode of the location tracking device 200 in which the location tracking device 200 preserves life of the battery 116 by minimising functions that are not required for detecting the movement state. That is, location tracking device 100 may disable functions not required for detecting the movement state to reduce power consumption and extend the life of the battery 116, for example.

In some embodiments, in the sleep mode RF communication functions of the location tracking device 200 are disabled. In some embodiments, in the sleep mode WiFi communications of the location tracking device 200 are disabled. In some embodiments, in the sleep mode mobile data communications of the location tracking device 200 are disabled. In some embodiments, in the sleep mode all functions of the location tracking device 200 not required in detecting the movement state are disabled. That is, any function of the location tracking device 200 not required to monitor movement of the location tracking device 200 via the movement sensor 114 and to detect the movement state are disabled, for example.

At step 612, the processing circuitry 110 determines whether initiating communication with the second location tracking device 100, 200, 300 was successful. If the connection is successful, method 600 proceeds to step 620, to be described in detail below. If the connection is unsuccessful, method 600 proceeds to step 614.

At step 614, the processing circuitry 110 executes instructions, stored in memory 112, to cause the first location tracking device 200 to perform a scan to identify at least one WiFi access point 232 via the WiFi communications module 210. At step 616, the processing circuitry 110 determines whether the scan identified at least one WiFi AP 232. If the scan did not identify at least one WiFi AP 232, method 600 proceeds to step 626, to be described in detail below. If the scan identifies at least one WiFi AP 232, method 600 proceeds to step 618.

At step 618, the processing circuitry 110 executes instructions, stored in memory 112, to cause the first location tracking device 200 to retrieve WiFi AP data from each connected WiFi AP 232 of the at least one WiFi APs 232. In some embodiments, the WiFi AP data of each WiFi AP 232 comprises a WiFi access point objects array. The WiFi AP data of each WiFi AP 232 includes at least a MAC address of the respective WiFi AP 232 and the signal strength of the communication with the WiFi AP 232 measured in dBm, for example. Each respective WiFi access point objects array may include at least the MAC address of the respective WiFi AP 232 and the signal strength of the communication with the WiFi AP 232 measured in dBm, and optionally also at least one of: the number of milliseconds since WiFi AP 232 was detected, the channel over which the first location tracking device 200 and the WiFi AP 232 are communicating, and the signal to noise ratio measured in dB. The signal strength of the communication with the WiFi AP 232 allows the external server to determine an approximate distance of the first location tracking device 100, 200, 300 from the location of the WiFi AP 232, which can also allow for location determination by triangulation where data is received about multiple such WiFi APs 232.

Upon retrieving the WiFi AP data from each connected WiFi AP 232 of the at least one WiFi APs 232, the processing circuitry 110 executes instructions, stored in the memory 112, to cause the first location tracking device 200 to wirelessly transmit the retrieved WiFi AP data to the external server 155 via the mobile data communications module 212. At step 619, the external server 155 processes the transmitted WiFi AP data using a WiFi fingerprinting API, such as Google's Geolocation API, to determine the location of the first location tracking device 200.

If the external server 155 determines the location of the first location tracking device 200, the first location tracking device 200 then receives, from the external server 155, an acknowledgement that location determination of the first location tracking device 200 was successful. If the external server 155 cannot determine the location of the first location tracking device 200, the first location tracking device 200 then receives, from the external server 155, an acknowledgement that location determination of the location tracking device 200 was unsuccessful. In some embodiments, the external server 155 may be configured to determine that the location determination of the first location tracking device 200 is unsuccessful if an accuracy returned by the WiFi fingerprinting API is below a particular threshold, wherein the accuracy is indicative of the accuracy of the determined location.

Upon receiving an acknowledgement indicating an unsuccessful location determination of the location tracking device 200 from the external server 155, method 600 proceeds to step 626. Upon receiving an acknowledgement indicating a successful location determination of the location tracking device 200 from the external server 155, method 600 proceeds to step 620.

Steps 620 to 626 of method 600 of the first location tracking device 200 correspond to steps 514 to 520 of method 500 of the first location tracking device 100, respectively.

Figure 7:
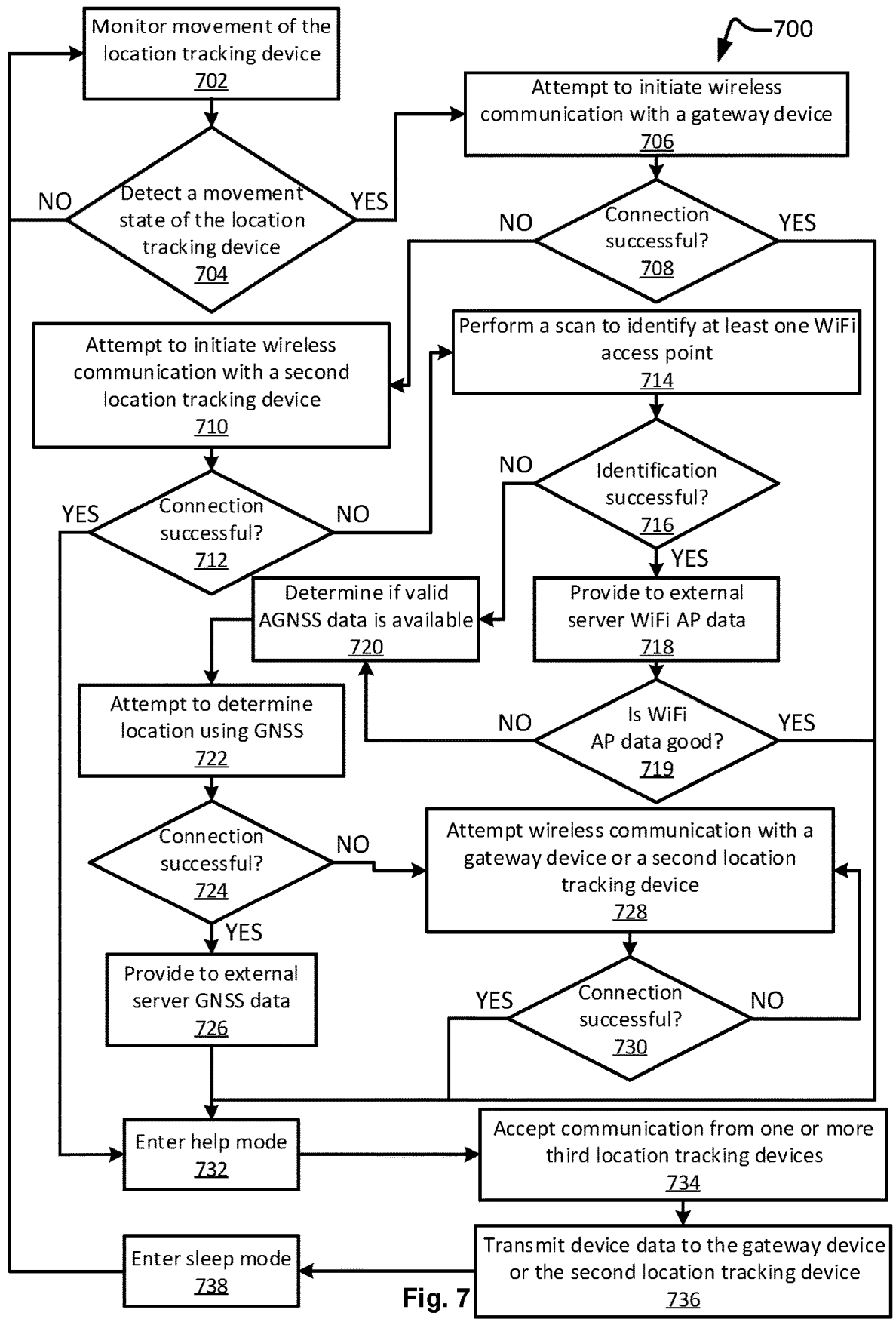
FIG. 7 is a process flow diagram of a method of determining the location of the location tracking device of FIG. 4, according to some embodiments.

Referring to FIG. 7, there is shown a process flow diagram of a method 700 of determining the location of the location tracking device 300 of FIG. 4, hereinafter referred to as a "first location tracking device 300", according to some embodiments. Steps 702 to 718 of method 700 of the first location tracking device 300 correspond to steps 602 to 618 of method 600 of the first location tracking device 200, respectively, the description of which is not repeated here for simplicity. Location tracking devices 300 have all of the functionality of location tracking devices 100, 200, plus additional hardware and functionality to perform the method 700, as described.

Steps 702 and 704 of method 600 may be referred to as a sleep mode. The sleep mode is an operational mode of the location tracking device 300 in which the location tracking device 300 preserves life of the battery 116 by minimising functions that are not required for detecting the movement state. That is, location tracking device 100 may disable functions not required for detecting the movement state to reduce power consumption and extend the life of the battery 116, for example.

In some embodiments, in the sleep mode RF communication functions of the location tracking device 300 are disabled. In some embodiments, in the sleep mode WiFi communications of the location tracking device 300 are disabled. In some embodiments, in the sleep mode mobile data communications of the location tracking device 300 are disabled. In some embodiments, in the sleep mode GNSS communications of the location tracking device 300 are disabled. In some embodiments, in the sleep mode all functions of the location tracking device 300 not required in detecting the movement state are disabled. That is, any function of the location tracking device 300 not required to monitor movement of the location tracking device 300 via the movement sensor 114 and to detect the movement state are disabled, for example.

At step 716, the processing circuitry 110 determines whether the scan identified at least one WiFi AP 232. If the scan identifies at least one WiFi AP 232\, method 700 proceeds to step 718, as previously described. If the scan did not identify at least one WiFi AP 232, method 700 proceeds to step 720.

At step 720, the processing circuitry 110 executes instructions, stored in memory 112, to check whether valid AGNSS data is stored in memory 112 of the first location tracking device 300. If no valid AGNSS data is stored in memory 112, the processing circuitry 110 executes instructions, stored in memory 112, to cause the first location tracking device 300 to wirelessly communicate with the external server 155 to request AGNSS data for the current location. Upon receiving the AGNSS data from the external server 155, the processing circuitry 110 executes instructions, stored in memory 112, to write the AGNSS data to memory

112. That is, if invalid AGNSS data, or no AGNSS data, is stored in the device data of memory 112, the processing circuitry 110 writes the received valid AGNSS data to the memory 112, for example.

If valid AGNSS data is stored in memory 112, or when the received valid AGNSS data is stored in memory 112, method 700 proceeds to step 722. At step 722 the processing circuitry 110 executes instructions, stored in memory 112, to cause the first location tracking device 300 to attempt to initiate wireless communication with satellite constellation 312 via the GNSS module 310. At step 724, the processing circuitry 110 determines whether initiating communication with the satellite constellation was successful. If the connection is successful, the first location tracking device 300 will receive GNSS data from the satellite constellation 312, indicating a location of the first location tracking device 300. Upon receiving the GNSS data from the satellite constellation 312, method 700 proceeds to step 726.

At step 726, the processing circuitry 110 executes instructions, stored in the memory 112, to cause the first location tracking device 300 to wirelessly transmit the received GNSS data to the external server 155 via the mobile data communications module 212. The first location tracking device 300 then receives, from the external server 155, an acknowledgement that the GNSS data was received by the external server 155. Upon receiving the acknowledgement from the external server 155, method 700 proceeds to step 732.

Steps 732 to 738 of method 700 of the first location tracking device 300 correspond to steps 620 to 626 of method 600 of the first location tracking device 200, respectively.

At step 724, if the connection to the satellite constellation 312 is unsuccessful, method 700 proceeds to step 728. At step 728, the processing circuitry 110 executes instructions, stored in the memory 112, to cause the first location tracking device 300 to attempt to initialise wireless communications with the gateway device and the second location tracking device 100, 200, 300. At step 730, the processing circuitry 110 determines whether initiating communication with the gateway device 130 or the second location tracking device 100, 200, 300 was successful. If the connection is successful, method 700 proceeds to step 732, as previously described. If the connection is unsuccessful, method 700 proceeds to back to step 728, as previously described. That is, the first location tracking device 300 will attempt to initialise wireless communication with the gateway device 130 and the second location tracking device 100, 200, 300 until a successful connection is made, for example.

In some embodiments, location tracking device 100 is configured to periodically perform steps 506 to 520 of method 500 without the movement state of the location tracking device 100 being detected. That is, the location tracking device 100 may periodically attempt to identify itself to the external server without moving, for example. In some embodiments, location tracking device 200 is configured to periodically perform steps 606 to 626 of method 600 without the movement state of the location tracking device 200 being detected. That is, the location tracking device 200 may periodically attempt to identify itself to the external server without moving, for example. In some embodiments, location tracking device 300 is configured to periodically perform steps 706 to 732 of method 700 without the movement state of the location tracking device 300 being detected. That is, the location tracking device 300 may periodically attempt to identify itself to the external server without moving, for example.

In some embodiments, each of the location tracking devices 100, 200, and 300 are configured to periodically attempt to identify themselves to the external server 155 at the same time. Each location tracking device 100, 200, 300 may be configured with the same stocktake schedule time, such that they are configured to attempt to identify themselves to the external server 155 at the same time or during a same time period. That is, all location tracking devices 100, 200, and 300 may perform the respective steps of methods 500, 600, and 700, respectively, periodically at the same time or during a same time period based on the configured function set (e.g. corresponding to its configuration data) of the respective location tracking device 100, 200, 300 and data stored therein, including the stocktake schedule, for example.

In some embodiments, a kit comprising at least two location tracking devices 100, 200, 300 configured to communicate with one another is provided. The at least two location tracking devices 100, 200, 300 are configured to wirelessly communicate with one another.

Figure 8:
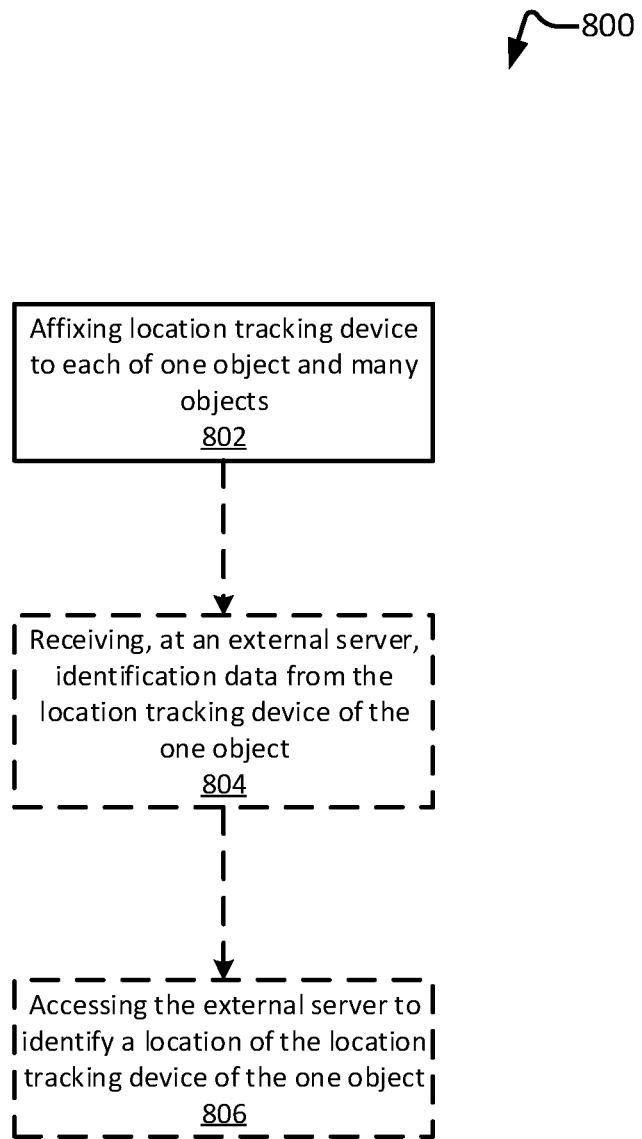
FIG. 8 is a process flow diagram of a method of object location tracking of one object from among many objects in a same vicinity, according to some embodiments.

Referring to FIG. 8, there is a process flow diagram of a method 800 of object location tracking of one object 99 from among many objects 99 in a same vicinity, according to some embodiments. At step 802 of method 800, a location tracking device 100, 200, 300 is affixed to each of the one object 99 and the many objects 99. In some embodiments, the one object 99 is a pallet. In some embodiments, the many objects 99 are pallets.

In some embodiments, the location tracking devices 100, 200, 300 of the one object 99 and the many objects 99 include the same functionality. That is, the one object 99 and the many objects 99 may each have the same type of location tracking device 100, 200, 300 affixed to them, such as location tracking device 100, for example. That is, the one object 99 and the many objects 99 may each have the same type of location tracking device 100, 200, 300 affixed to them, such as location tracking device 200, for example. That is, the one object 99 and the many objects 99 may each have the same type of location tracking device 100, 200, 300 affixed to them, such as location tracking device 300, for example.

In some embodiments, the location tracking devices 100, 200, 300 of the one object 99 and the many objects 99 include different functionality according to the functionality of a variety of ones of the location tracking devices 100, 200, 300. That is, the one object 99 and the many objects 99 may carry different types of respective ones of location tracking devices 100, 200, 300 affixed to them, such as location tracking device 100 and location tracking device 200, for example. The one object 99 and the many objects 99 may respectively carry a combination of any one of location tracking device 100, location tracking device 200, and location tracking device 300, affixed to them, for example.

The location tracking device 100, 200, 300 is configured to, as described above, detect the movement state of the location tracking device 100, 200, 300. The location tracking device 100, 200, 300 is further configured to, as described above, in response to detecting the movement state, attempt to establish a connection to identify itself to the external server 155. The location tracking device 100, 200, 300 is further configured to, as described above, if the connection is established, allow connection with one or more other location tracking devices 100, 200, 300, so that the one or more other location tracking devices 100, 200, 300 can be identified to the external server 155.

In some embodiments, the location tracking device 100, 200, 300 is further configured to, as described above, if the connection is not established, disable all functionality of the location tracking device 100, 200, 300 not required to detect the movement state of the location tracking device 100, 200, 300.

In some embodiments, method 800 further includes step 804. At step 804, the external server 155 receives device identification data from the location tracking device 100, 200, 300 of the one object 99. The received device identification data uniquely identifies the one object 99. In some embodiments, the external server 155 receives device identification data from the location tracking device 100, 200, 300 of the one object 99 and the location tracking devices 100, 200, 300 of the many objects 99.

In some embodiments, the device identification data of the location tracking devices 100, 200, 300 of the many objects 99 is received from the location tracking device 100, 200, 300 of the one object 99.

In some embodiments, method 800 further includes step 806. At step 806, the external server 155 is accessed to identify a location of the location tracking device 100, 200, 300 of the one object 99. Identifying the location of the location tracking device 100, 200, 300 of the one object 99 identifies a location of the one object 99. In some embodiments, the external server 155 is accessed to identify a location of the location tracking devices 100, 200, 300 of the many objects 99. Identifying the location of the location tracking devices 100, 200, 300 of the many objects 99 identifies a location of the many objects 99.

Referring back to FIG. 1, some embodiments relate to a system 16 for object 99 location tracking, including at least two of any of location tracking devices 100, 200, 300 that are in communication with each other or at least have been in communication with each, where one of the location tracking devices 100, 200, 300 provides or has provided help in the help mode to another one of location tracking devices 100, 200, 300. Further, some embodiments relate to a system for object 99 location tracking in which system 16 includes the external server 155. For example, the external server 155 may receive device data from at least one of the location tracking devices 100, 200, 300 of system 16 (e.g. via cellular data communications or via network 150), and optionally also transmits device data (such as configuration data) to at least one of the location tracking devices 100, 200, 300 of system 16 (e.g. via cellular data communications or via network 150). In such embodiments, the server 155 may be in communication with network 150 and at least one of the location tracking devices 100, 200, 300 of system 16 can communicate with the network 150, so that the external server 155 and at least one of the location tracking devices 100, 200, 300 can communicate with each other when possible. Each of the at least two location tracking devices 100, 200, 300 is carried by an object 99, which allows the external server 155 to track the location of the object 99.

Each of the at least two location tracking devices 100, 200, 300 of system 16 is configured to, as described above, detect the movement state of the location tracking device 100, 200, 300. Each of the at least two location tracking devices 100, 200, 300 is further configured to, as described above, in response to detecting the movement state, establish (or at least attempt to establish) a connection to identify itself to the external server 155. Each of the at least two location tracking devices 100, 200, 300 is further configured to, as described above, if the connection is established, allow connection with one or more other location tracking devices 100, 200, 300 of the at least two location tracking devices 100, 200, 300, so that the one or more other location tracking devices 100, 200, 300 can be identified to the external server 155.

The external server 155 is configured to identify a location of each object 99 based on a location of their respective location tracking device 100, 200, 300 of system 16.

In some embodiments, the at least two location tracking devices 100, 200, 300 of system 16 include the same functionality. That is, system 16 may include at least two location tracking devices 100, for example. That is, system 16 may include at least two location tracking devices 200, for example. That is, system 16 may include at least two location tracking devices 300, for example.

In some embodiments, the at least two location tracking devices 100, 200, 300 of system 16 include different functionality. That is, system 16 may include a combination of at least two of any one of location tracking device 100, location tracking device 200, and/or location tracking device 300, for example.

Numerous variations and/or modifications may be made to the above-described embodiments, without departing from the broad general scope of the present disclosure. The present embodiments are, therefore, to be considered in all respects as illustrative and not restrictive.

The invention claimed is:

1. A location tracking device to be carried by an object for tracking the location of the object, wherein the location tracking device is a first location tracking device comprising:
   processing circuitry;
   memory accessible to the processing circuitry, wherein the memory is configured to store first device data of the first location tracking device, the first device data including location data;
   a movement sensor to detect movement of the first location tracking device;
   a low-power short-range radio frequency (RF) communications module;
   a battery to supply power to the processing circuitry, the memory, the movement sensor, and the communications module;
   a housing to house the processing circuitry, the memory, the movement sensor, the communications module, and the battery; and
   wherein the memory stores instructions that, when executed by the processing circuitry, cause the processing circuitry to:
      detect a movement state, based on output of the movement sensor, in which the first location tracking device has moved for a first minimum time period followed by no movement for a second minimum time period;
      in response to detecting the movement state, attempt to initiate wireless communication to a gateway device, via the RF communications module:
         if the attempt to initiate wireless communication to the gateway device is successful, then set an operational mode of the first location tracking device to a help mode to allow communication with at least one third location tracking device, via the RF communications module;
         if the attempt to initiate wireless communication to the gateway device is unsuccessful, then attempt to initiate communication to a second location tracking device, via the RF communications module:

if the attempt to initiate wireless communication to the second location tracking device is unsuccessful, then set the operational mode of the first location tracking device to a sleep mode;

if the attempt to initiate wireless communication to the second location tracking device is successful, then set the operational mode of the first location tracking device to the help mode to allow communication to at least one third location tracking device, via the RF communications module;

wherein in the help mode, the processing circuitry is configured to execute instructions to:

allow communication with the at least one third location tracking device, via the RF communications module, for a third minimum time period;

transmit the first device data and received device data from the at least one third location tracking device to the gateway device or the second location tracking device, via the RF communications module; and set the operational mode of the first location tracking device to the sleep mode after transmitting the first device data and received device data from the at least one third location tracking device.

2. The first location tracking device of claim 1, wherein transmitting the first device data and received device data further includes transmitting, when no third location tracking devices are in communication with the first location tracking device, the first device data and received device data from the at least one third location tracking device to the gateway device or the second location tracking device, via the RF communications module.

3. The first location tracking device of claim 1, wherein the memory stores further instructions that, when executed by the processing circuitry, cause the processing circuitry to exit the sleep mode, if the first location tracking device is in the sleep mode when the movement state is detected.

4. The first location tracking device of claim 1, wherein in the sleep mode at least one of:

RF communication functions of the first location tracking device are disabled; and all functions of the first location tracking device not required in detecting the movement state are disabled.

5. The first location tracking device of claim 1, wherein at least one of:

the first minimum time period is between about 5 seconds to about 30 seconds; and the second minimum time period is between about 5 seconds to about 30 seconds or between about 5 seconds to about 3 minutes.

6. The first location tracking device of claim 1, wherein the help mode is performed for a third minimum time period between about 1 second to about 30 seconds or between about 1 second to about 3 minutes.

7. The first location tracking device of claim 1, wherein at least one of:

the first location tracking device is configured to attempt to initiate wireless communication with the gateway device for a first maximum time period; and the first location tracking device is configured to attempt to initiate wireless communication with the second location tracking device for a second maximum time period after the attempt to communicate with the gateway device is unsuccessful.

8. The first location tracking device of claim 1, wherein the first location tracking device further comprises:

a WiFi communications module and a mobile data communications module powered by the battery and housed in the housing; and wherein the memory further stores instructions that, when executed by the processing circuitry, cause the processing circuitry to:

if the attempt to initiate wireless communication to the second location tracking device via the RF communications module is unsuccessful, then, prior to setting the operational mode of the first location tracking device to the sleep mode, perform a scan to identify at least one WiFi access point, via the WiFi communications module;

if the scan does not identify at least one WiFi access point, then set the operational mode of the first location tracking device to the sleep mode; and if the scan identifies at least one WiFi access point, then:

receive, via the WiFi communications module, WiFi access point data from the WiFi access point;

transmit, via the mobile data communications module, the WiFi access point data to an external server for identifying a location of the first location tracking device based on the transmitted WiFi access point data; and set the operational mode of the first location tracking device to the help mode to allow communication, via the RF communications module, to at least one third location tracking device.

9. The first location tracking device of claim 8, wherein in the help mode, transmitting the first device data and received device data includes:

transmitting the first device data and the received device data from the at least one third location tracking device to:

the gateway device, if communication to the gateway device via the RF communications module is successful;

the second location tracking device, if communication to the second location tracking device via the RF communications module is successful; or to the external server via the mobile data communications module.

10. The first location tracking device of claim 8, wherein in the help mode, the instructions further include instructions to:

prior to transmitting the first device data and the received device data from the at least one third location tracking device to the external server via the mobile data communications module, attempt to initiate wireless communication to at least one of: another gateway device or another second location tracking device that includes a mobile data communications module.

11. The first location tracking device of claim 8, wherein in the help mode, the processing circuitry is configured to execute instructions to:

allow communication from the at least one third location tracking device, via the RF communications module, for a third minimum time period;

transmit the first device data and the received device data from the at least one third location tracking device to:

the gateway device, if communication to the gateway device via the RF communications module is successful;

the second location tracking device, if communication to the second location tracking device via the RF communications module is successful; or attempt to initiate wireless communication with at least one of another gateway device or another second location tracking device that includes a mobile data communications module;
if the attempt to initiate wireless communication to the another gateway device or another second location tracking device that includes a mobile data communications module is successful, transmit the first device data and the received device data from the at least one third location tracking device to the another gateway device or the another second location tracking device and set the operational mode of the first location tracking device to the sleep mode;
if the attempt to initiate wireless communication to the another gateway device or another second location tracking device that includes a mobile data communications module is unsuccessful, transmit the first device data and received device data to the external server via the mobile data communications module and set the operational mode of the first location tracking device to the sleep mode.

12. The first location tracking device of claim 8, wherein the first location tracking device is configured to attempt to initiate wireless communication with the at least one WiFi access point for a third maximum time period.

13. The first location tracking device of claim 8, wherein the first location tracking device further comprises:
a GNSS module powered by the battery and housed in the housing; and
wherein the memory further stores instructions that, when executed by the processing circuitry, cause the processing circuitry to:
if the scan does not identify at least one WiFi access point, then, prior to setting the operational mode of the first location tracking device to the sleep mode, attempt to determine a location of the first location tracking device via the GNSS module;
if the attempt to determine the location of the first location tracking device via the GNSS module is successful, then:
receive, via the GNSS module, GNSS data from a satellite constellation;
transmit, via the mobile data communications module, GNSS data to an external server for identifying a location of the first location tracking device based on the transmitted GNSS data; and
set the operational mode of the first location tracking device to the help mode to allow communication to at least one third location tracking device via the RF communications module.

14. A system including the first location tracking device of claim 1 and another first location tracking device, wherein the first location tracking devices have communicated with each other.

15. The system of claim 14, further including multiple ones of the first location tracking device, wherein each of the first location tracking devices has communicated with at least another one of the first location tracking devices.

16. The system of claim 14, wherein the first location tracking devices are configured to cooperate to establish a network of wirelessly connected first location tracking devices.

17. The system of claim 14, further including an external server, wherein at least one of the first location tracking devices is configured to communicate with the external server.

18. A method of object location tracking including:
configuring multiple types of the first location tracking devices of claim 1 to be wirelessly connectable with each other;
locating each of the first location tracking devices on a respective object to be tracked; and
receiving at a server device data from at least one of the first location tracking devices to enable location identification of the first location tracking devices.

19. A pallet carrying the first location tracking device of claim 1.

* * * * *